United States Patent
Nehmadi et al.

(10) Patent No.: US 10,445,928 B2
(45) Date of Patent: Oct. 15, 2019

(54) METHOD AND SYSTEM FOR GENERATING MULTIDIMENSIONAL MAPS OF A SCENE USING A PLURALITY OF SENSORS OF VARIOUS TYPES

(71) Applicant: VayaVision, Ltd., Or Yehuda (IL)

(72) Inventors: Youval Nehmadi, Nili (IL); Shmuel Mangan, Nes Ziyona (IL); Shahar Ben-Ezra, Tel-Aviv (IL); Anna Cohen, Holon (IL); Ronny Cohen, Ramat Hasharon (IL); Lev Goldentouch, Rishon Leziyon (IL); Shmuel Ur, Shorashim (IL)

(73) Assignee: VAYAVISION LTD., Or Yehuda (IL)

( * ) Notice: Subject to any disclaimer, the term of this patent is extended or adjusted under 35 U.S.C. 154(b) by 0 days.

(21) Appl. No.: 15/892,039

(22) Filed: Feb. 8, 2018

(65) Prior Publication Data
US 2018/0232947 A1    Aug. 16, 2018

Related U.S. Application Data

(60) Provisional application No. 62/457,818, filed on Feb. 11, 2017.

(51) Int. Cl.
*G06T 15/00* (2011.01)
*G06T 17/05* (2011.01)
(Continued)

(52) U.S. Cl.
CPC .............. *G06T 17/05* (2013.01); *G01S 7/295* (2013.01); *G01S 13/86* (2013.01); *G01S 13/865* (2013.01);
(Continued)

(58) Field of Classification Search
CPC . G06T 17/05; G06T 2210/61; G06T 2220/08; G06T 3/4007; G01S 13/89;
(Continued)

(56) References Cited

U.S. PATENT DOCUMENTS

| 5,128,874 A | 7/1992 | Bhanu et al. |
| 5,195,144 A | 3/1993 | Parquier et al. |

(Continued)

FOREIGN PATENT DOCUMENTS

| CN | 104567917 A | 4/2015 |
| DE | 10361869 A1 | 7/2005 |

(Continued)

OTHER PUBLICATIONS

Autonomous Cars from Berlin, Autonomous Labs, Research, 2015, pp. 1-6, http://autonomos-labs.com/research/, last accessed Feb. 9, 2018.

(Continued)

*Primary Examiner* — Phu K Nguyen
(74) *Attorney, Agent, or Firm* — Reches Patents

(57) ABSTRACT

A system and method for generating a high-density three-dimensional (3D) map are disclosed. The system comprises acquiring at least one high density image of a scene using at least one passive sensor; acquiring at least one new set of distance measurements of the scene using at least one active sensor; acquiring a previously generated 3D map of the scene comprising a previous set of distance measurements; merging the at least one new set of distance measurements with the previous set of upsampled distance measurements, wherein merging the at least one new set of distance measurements further includes accounting for a motion transformation between a previous high-density image frame and the acquired high density image and the acquired distance measurements; and overlaying the new set of (Continued)

distance measurements on the high-density image via an upsampling interpolation, creating an output 3D map.

20 Claims, 21 Drawing Sheets

(51) Int. Cl.
| | |
|---|---|
| *G01S 17/89* | (2006.01) |
| *G01S 13/89* | (2006.01) |
| *G06K 9/00* | (2006.01) |
| *G06T 3/40* | (2006.01) |
| *G01S 17/02* | (2006.01) |
| *G01S 17/93* | (2006.01) |
| *G01S 7/295* | (2006.01) |
| *G01S 13/86* | (2006.01) |
| *G01S 13/93* | (2006.01) |
| *H04N 7/18* | (2006.01) |

(52) U.S. Cl.
CPC ............ *G01S 13/867* (2013.01); *G01S 13/89* (2013.01); *G01S 13/931* (2013.01); *G01S 17/023* (2013.01); *G01S 17/89* (2013.01); *G01S 17/936* (2013.01); *G06K 9/00791* (2013.01); *G06K 9/00805* (2013.01); *G06T 3/4007* (2013.01); *G01S 2013/9367* (2013.01); *G01S 2013/9375* (2013.01); *G01S 2013/9385* (2013.01); *G01S 2013/9392* (2013.01); *G06T 2200/08* (2013.01); *G06T 2210/61* (2013.01); *H04N 7/18* (2013.01); *H04N 7/183* (2013.01)

(58) Field of Classification Search
CPC ...... G01S 17/023; G01S 17/936; G01S 7/295; G01S 13/86; G01S 13/865; G01S 13/867; G01S 13/931; G01S 2013/9367; G01S 2013/9375; G01S 2013/9385; G01S 2013/9392; G01S 17/89; G06K 9/00805; H04N 7/183; H04N 7/18
USPC ........................................................ 345/418
See application file for complete search history.

(56) References Cited

U.S. PATENT DOCUMENTS

| | | | |
|---|---|---|---|
| 5,831,717 A | 11/1998 | Ikebuchi | |
| 5,887,268 A | 3/1999 | Furukawa | |
| 5,923,417 A | 7/1999 | Leis | |
| 6,323,941 B1 | 11/2001 | Evans et al. | |
| 6,502,053 B1 | 12/2002 | Hardin et al. | |
| 6,553,130 B1 | 4/2003 | Lemelson et al. | |
| 6,763,292 B1 | 7/2004 | Smith et al. | |
| 7,124,072 B1 * | 10/2006 | Thekkath | G06F 9/3861 703/26 |
| 7,202,776 B2 | 4/2007 | Breed | |
| 7,359,782 B2 * | 4/2008 | Breed | B60R 21/0134 180/274 |
| 7,385,626 B2 | 6/2008 | Aggarwal et al. | |
| 7,508,496 B2 | 3/2009 | Mettenleiter et al. | |
| 7,619,754 B2 | 11/2009 | Riel et al. | |
| 7,783,403 B2 * | 8/2010 | Breed | B60R 21/0134 340/435 |
| 7,852,461 B2 | 12/2010 | Yahav | |
| 7,865,299 B2 | 1/2011 | Caveney | |
| 8,125,622 B2 | 2/2012 | Gammenthaler | |
| 8,138,022 B2 | 3/2012 | Sugiyama et al. | |
| 8,189,051 B2 | 5/2012 | Shih et al. | |
| 8,290,208 B2 | 10/2012 | Kurtz et al. | |
| 8,446,492 B2 | 5/2013 | Nakano et al. | |
| 8,547,374 B1 | 10/2013 | Sadjadi et al. | |
| 8,548,229 B2 | 10/2013 | Badino et al. | |
| 8,587,686 B1 | 11/2013 | Riza et al. | |
| 8,723,717 B2 | 5/2014 | Saito | |
| 8,736,818 B2 | 5/2014 | Weimer et al. | |
| 8,761,594 B1 | 6/2014 | Gross et al. | |
| 8,791,851 B2 | 7/2014 | Elad et al. | |
| 9,164,511 B1 | 10/2015 | Ferguson et al. | |
| 9,188,980 B2 | 11/2015 | Anderson | |
| 9,424,468 B2 | 8/2016 | Shimizu et al. | |
| 10,099,614 B2 * | 10/2018 | Diessner | H04N 7/18 |
| 2005/0200832 A1 | 9/2005 | Kawai et al. | |
| 2009/0140887 A1 | 6/2009 | Breed et al. | |
| 2010/0014781 A1 | 1/2010 | Liu et al. | |
| 2010/0040285 A1 | 2/2010 | Csurka et al. | |
| 2010/0245535 A1 | 9/2010 | Mauchly | |
| 2011/0141306 A1 | 6/2011 | Nakano et al. | |
| 2011/0292406 A1 | 12/2011 | Hollenbeck et al. | |
| 2012/0148100 A1 | 6/2012 | Kotake et al. | |
| 2012/0314037 A1 | 12/2012 | Nehmadi et al. | |
| 2012/0326959 A1 | 12/2012 | Murthi et al. | |
| 2013/0021595 A1 | 1/2013 | Guetta | |
| 2013/0107065 A1 | 5/2013 | Venkatraman et al. | |
| 2013/0174102 A1 | 7/2013 | Leu | |
| 2014/0078263 A1 | 3/2014 | Kim | |
| 2014/0094307 A1 | 4/2014 | Doolittle et al. | |
| 2014/0132722 A1 | 5/2014 | Bauza et al. | |
| 2014/0139639 A1 | 5/2014 | Wagner et al. | |
| 2014/0267631 A1 | 9/2014 | Powers | |
| 2015/0071541 A1 | 3/2015 | Qutub et al. | |
| 2015/0340875 A1 | 11/2015 | Prasad | |
| 2015/0356357 A1 | 12/2015 | McManus et al. | |
| 2016/0018526 A1 | 1/2016 | Bossche et al. | |

FOREIGN PATENT DOCUMENTS

| | | |
|---|---|---|
| EP | 2204670 B1 | 6/2014 |
| JP | 3304687 B2 | 7/2002 |
| WO | 2000012960 A1 | 3/2000 |
| WO | 2008070319 A2 | 6/2008 |

OTHER PUBLICATIONS

Liu, et al., "A Framework for Applying Point Clouds Grabbed by Multi-Bean LIDAR in Perceiving the Driving Environment", Switzerland, Sensors Article, 2015, pp. 21931-21956.

The International Search Report and the Written Opinion for PCT/US2016/025252, ISA/RU, Moscow, Russia, dated Aug. 11, 2016.

* cited by examiner

METHOD AND SYSTEM FOR GENERATING MULTIDIMENSIONAL MAPS OF A SCENE USING A PLURALITY OF SENSORS OF VARIOUS TYPES

CROSS-REFERENCE TO RELATED APPLICATIONS

This application claims the benefit of U.S. Provisional Application No. 62/457,818 filed on Feb. 11, 2017, the contents of which are hereby incorporated by reference.

TECHNICAL FIELD

The present disclosure relates generally to the generation of multidimensional maps, and more specifically, to the generation of three dimensional maps using various sensors, including LiDAR and radar sensors, for use with an autonomous vehicle.

BACKGROUND

An autonomous vehicle (also known as a driverless car, self-driving car, or robotic car) is a vehicle that can navigate without direct human control. An autonomous vehicle may analyze the surrounding environment by using a variety of sensing technologies, such as traditional optical image sensors, LiDARs, radars, GPS sensors, IMUs (inertial measurement units), acoustic sensors, odometers, and other sensors accessible via the vehicle's various interfaces. Advanced control systems interpret sensory information to identify appropriate navigation paths, as well as obstacles and relevant signage. Autonomous cars may be equipped with control systems for analyzing sensory data in order to distinguish between different cars or obstacles on the road. Driverless technology has been developed by Google®, Tesla®, as well as other vehicles manufacturers such as Audi®, BMW®, Nissan®, and the like.

Other companies such as, e.g., Mobileye®, are presently trying to provide solutions for hands-free driving technology. Use of this technology is typically limited to particular driving infrastructures such as, e.g., highways or country roads. The cornerstone of such hands-free driving and autonomous vehicle technologies is the rendering or generation of a 3-dimensional (3D) map of a scene at any given moment during or immediately prior to the vehicle's motion. Such a map attempts to mimic a scene digitally as it would normally be seen by a driver. Similar technologies may be applied not only to automobiles, but also to a wide range of drones, including flying drones, walking drones and otherwise mobile drones.

Each imaging technology offers particular advantages as well as disadvantages. Optical sensors, which may be labelled as passive systems, are economical to produce and use to produce an image that is similar to what the human eye can see. Furthermore, commodity image sensors may provide a high resolution, a high density and a high data rate. For example, a typical image sensor of 2K format may have 2.1 megapixels of resolution and may operates at 60 FPS. An optical sensor may be fitted with a wide-angle phi-theta (fisheye) lens to achieve a wide field of view or with a regular (normal) lens to achieve uniform resolution in a narrower field of view.

Optical sensors have limits regarding the dynamic range that they can adequately capture and may require appropriate lighting conditions to produce useful images. If there lacks sufficient ambient natural light, artificial light must be produced to allow the optical sensor to capture a useable image, which can be expensive, cumbersome, and limiting. Certain atmospheric conditions, such as rain, fog or snow, can greatly reduce visibility and limit the effectiveness of a camera using an optical sensor. Optical sensors may also be blinded by excessive illumination producing saturated reading and so called "flare" optical effects. Further, single image sensors alone provide no information about the distance between the camera and an object, and while stereoscopy, i.e., using two sensors or two images with sensor movement in between each, can provide distance information, it has diminishing accuracy beyond 10 meters.

Challenging imaging conditions can be overcome by using a combination of cameras. For example, in some systems, optical RGB cameras may be used during the daytime while thermal cameras can be used during the limited lighting of nighttime. Additionally, multiple wide-angle cameras can be used to provide 360 degree coverage around the vehicle. However, even the use of various optical cameras can still fall short of a desired image result.

Radar devices address some of the shortcomings of optical sensors. A radar is an active system, as it includes a transmitter configured to produce electromagnetic waves in the microwave domain coupled with an emitting antenna. A receiving antenna is configured to capture return electromagnetic waves reflected off of objects positioned in the path of the emitted signal. A radar, compared to an optical sensor, has low angular resolution, due to having a wide angular beam, and therefore provides low-density coverage of the angular field of view. Furthermore, the radars are sometimes configured to have horizontal plane resolution without vertical plane resolution. Therefore, it is mostly appropriate for detecting large objects, especially vehicles. On the other hand, is has excellent accuracy of distance measurement and may cover distance ranges of several hundreds of meters. The radar may also measure the speed of the objects via a Doppler effect reading. Radars are typically not subject to visible lighting conditions and can be equally effective in light or dark environments. Similar to an optical camera, radars are usually economical, both in production and operation. They can be used in certain environmental conditions, such as fog and snow, which severely limit the effectiveness of an optical sensor. Finally, a radar has a strong dependence on the properties of the reflecting objects that it observes, which can be advantageous or disadvantageous, depending on the particular scenario.

LiDAR is similar to radar, but uses a laser light beam to create a virtual image instead of radio waves. The light beam is sent as a pulse in a specific direction toward a scene and a receiver detects reflections from the light beam pulse, which are then used to produce a three-dimensional virtual image. The distance accuracy of a LiDAR is excellent, and its range is limited only by the available peak power of the source laser. As the wavelengths used for LiDAR are much shorter than radar waves the angular resolution of LiDAR beam is typically an order of magnitude better than that of a radar.

LiDAR data rate, however, is limited, and it typically provides about two orders of magnitude fewer samples than an image sensor. Most commercial LiDAR systems use several LiDAR sensors working in tandem to improve the spatial resolutions. In some commercial sensors, like Velodyne® sensors, the LiDARs are mounted on a rotating shaft to produce 360 degrees coverage with horizontal resolution equivalent to the sampling frequency and vertical resolution of the combined number of the scanning LiDAR sensors used. However, combining multiple individual LiDAR sensors increases the cost and size of the LiDAR systems.

Furthermore, unlike radar, LiDAR imaging is limited in certain lighting conditions, such as when facing a bright light source such as the sun, and is subject to deterioration on low visibility or bad weather conditions similar to an image acquired by a camera. Additionally, the use of LiDAR can present safety issues if exposed to a human eye, unless the power of the laser beams is set accordingly, which influences the LiDAR's performance, especially regarding its effective range. Power source constraints, namely the average power of the laser beams, is an additional factor to account for when using LiDAR to detect far objects due to human eye safety constraints, as the LiDAR may be required to conform with Class-1 laser safety standards.

In addition to LiDARs and radars with fixed scanning characteristics, there exists controllable scanners that use micro-electro-mechanical system (MEMS) for LiDAR scanning and Phased Array for radar scanning. The MEMS solution usually includes a system of mirrors that may rotate sufficiently fast for a LiDAR to scan a large area. The phased array solution includes multiple antennas with programmable phase shift between them, so that the resulting response function is equivalent to a larger and quickly moving antenna. However, these controllable sensors are typically less energy efficient than fixed sensors, resulting in a lower sampling rate.

A further form of sensor that can be used to locate objects within a scene include acoustic devices. When used in water, these devices are known as SONARs. Similar devices can be used a dry atmosphere as well. A sound wave, often ultrasonic, or vibrations above the limits of human hearing, is emitted and its acoustic reflections are then detected, which allows a system to determine the shape and movement of an object.

Acoustic sensors offer certain characteristics that exceed performance of optical LiDAR sensors in certain conditions. For example, optical sensors have limited depth of field (DOF) and LiDARs and radars have limited dynamic range. Moreover, these sensors are often designed to be located in an upper part of a vehicle to increase their effective range. Accordingly, acoustic sensors may be placed on a lower part of the vehicle, such as a bumper, to provide distance information for objects that are not visible by the optical sensors, LiDARs, or radars. Moreover, these acoustic sensors are inexpensive to produce and are not affected by atmospheric conditions. Each acoustic sensor typically provides only one distance measurement, and due to its use of sound waves, which travel much slower than electromagnetic waves, the sampling speed is much lower than other sensors. As such, acoustic sensors are typically used for low speed driving and parking situations.

Additional sensors useful for autonomous vehicles include Global Positioning System (GPS) sensors and orientation and motion sensors. GPS provides spatial positioning with accuracy within meters of a location, using triangulation of transmissions from several satellites. Inertial measurement units (IMU) use a combination of accelerometers, gyroscopes and magnetometers to provide orientation and motion data. The combination of GPS and IMU may be used to provide a vehicle's current geolocation, orientation and motion. This information may be used to define road conditions, to compensate the vehicle's motion and to employ external geolocal data, such as predetermined maps and annotations.

The readings from the multitude of sensors may be further combined into a complex environment map, out of which environment parameters may be calculated. The environment parameters analysis may include detection of free space for driving, road detection, lane detection, road sign detection, pedestrian detection, car detection, and other available road element and obstacle detection.

There are several ways used to calculate the environment map, including separate environment analysis per sensor and cross-validation using pairs of sensors. For example, one may detect vehicles in an optical image and measure the distance to the vehicles using a radar.

An alternative method includes rendering of a time-variant 3D map, typically accomplished by measuring distances to many points in the 3D space of a scene to determine the existence of objects and their respective distances from the vehicle.

The rendered 3D maps may be combined and processed to produce the environment model to assist driving decisions made by an autonomous vehicle. Existing solutions for rendering detailed 3D maps are based on LiDAR systems. Such existing solutions configure the LiDAR system to scan the entire environment. This requires a large number of laser measurements to render a single 3D map. Imperfect scene coverage with LiDAR scan may result in the missing or misdetection of an obstacle and increase the possibility of a traffic accident.

For example, FIG. 1A shows an image 100 of a scene for which a 3D map is generated. Some existing solutions for implementing hands-free and autonomous driving technologies rely on a raster scan LiDAR distance sensor for measurement of the distance to each point 110 in the image 100, as shown in FIG. 1B. Thus, if the system is using a LiDAR, a laser beam illuminates each such point to render a 3D map. An alternative method for identifying various objects and areas within a single image using LiDAR technology includes focusing on separate regions of interests as shown in FIG. 1C, such as vehicles 122, pedestrians, 123, stationary structures 124 and roadways 122. LiDAR solutions that are designed to provide optimal measurement density and scan rates are very complex and expensive, and yet trail optical image sensors in both density and data rate by up to two orders of magnitude. As an example, a robotic car currently made by Google® includes equipment with a LiDAR system that can cost up to $70,000. This LiDAR system includes a 64-beam laser and produces high density 3D maps. Similar LiDARs having only 16 beams currently cost only $7,000 but produce a much lower density 3D map. Using a low-cost LiDAR as is produces a low-density 3D map that lacks the definition to reliably identify small obstacles on the road, and is therefore unfitting for autonomous driving. Currently, LiDAR is regarded as a critical component to any solution for autonomous driving; however, due to the high cost of the hardware for rendering the 3D maps, mass production of autonomous vehicles equipped with such systems are not feasible. Thus, a solution is desired that allows using a low-cost LiDAR in tandem with optical imaging and, optionally, a radar and other sensors to produce economically and technically satisfactory results. It should be noted that only a few points 110 are specifically labeled in FIG. 1 merely for simplicity purposes.

It would therefore be advantageous to provide a solution for generating high density 3D maps based on low density distance sensors and high-density image sensor that would overcome the deficiencies of each sensor and the prior art, including measurement resolution, update frequency, minimal and maximal distance, geolocation, weather conditions handling and redundancy for safety purposes.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality.

The various disclosed embodiments include a method for analyzing a scene using passive and active measurements. The method includes using a plurality of image sensing devices in tandem in order to properly render a virtual image of a scene. The steps taken may be adjusted with respect to the current conditions of the scene.

Figure 1A:
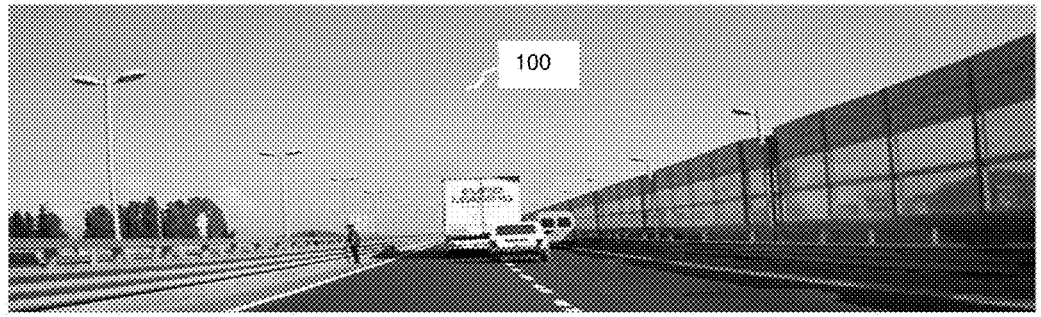
FIG. 1A is an example scene captured by a sensor for analysis.
Figure 1B:
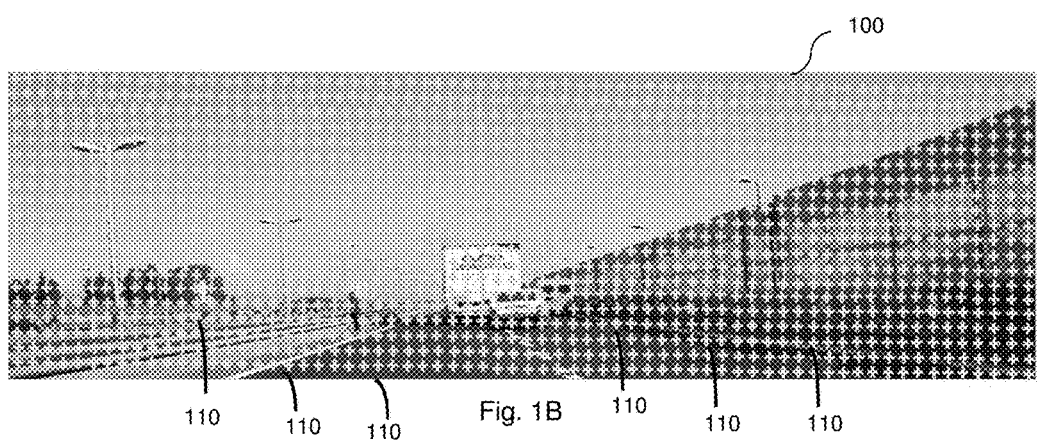
FIG. 1B shows the example scene divided into a grid for analysis purposes.
Figure 1C:
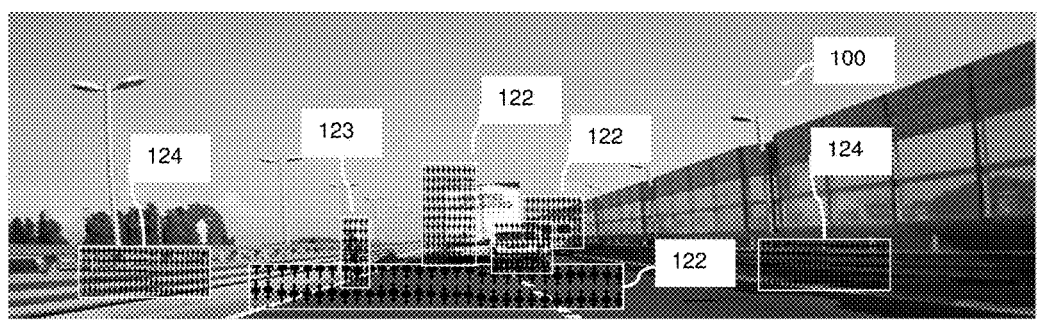
FIG. 1C shows various objects and areas of interest highlighted within the example scene.
Figure 2A:
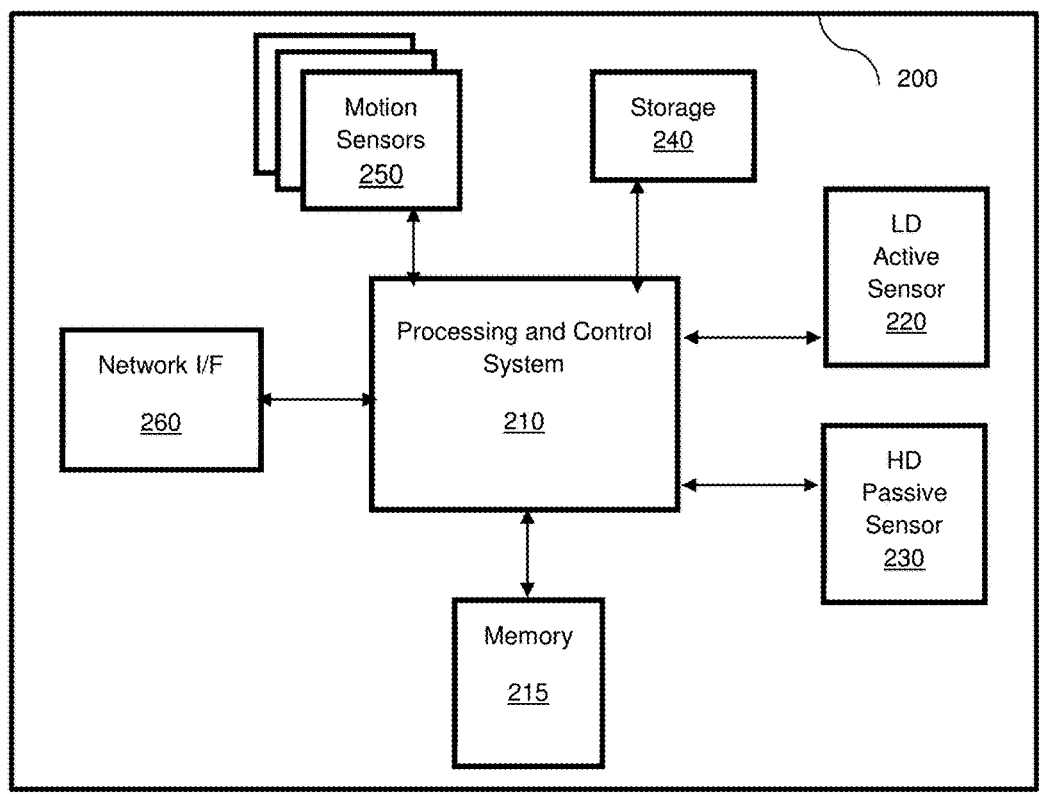
FIG. 2A is a block diagram of an apparatus configured to generate environment analysis from a vehicle according an embodiment.

FIG. 2A shows an example block diagram of an apparatus 200 configured to generate high-density 3D maps at a video refresh rate, while mounted on a host system, according to one embodiment. The apparatus 200 includes a memory 215, one or more high-density video-rate capable passive sensor 230, and one or more low-density active sensor 220 connected to the processing and control system 210. In certain configurations, the apparatus 200 further includes a storage 240, one or more motion sensors 250, and a network interface 260 connected to the processing system 210.

The apparatus 200 can be, e.g., mounted on or integrated within a vehicle. Such a vehicle may be, for example, a car, a truck, a bus, a drone, a robot, and the like. The apparatus 200 can be utilized to generate high density 3D maps of the scene as would be observed from within the vehicle. In an embodiment, the apparatus 200 is configured to control part or all of the operation of the vehicle based on analysis of the generated 3D maps. Therefore, the apparatus 200 can be utilized in applications related to autonomous vehicles, hands-free driving systems, driver assistance systems, and the like.

The passive sensor 230 may be a video rate high-definition image sensor (e.g., a monochrome or color camera) configured to passively acquire images. The acquired images can be processed by a processing and control system 210 or inside the passive sensor 230 using image processing techniques.

The active sensor 220 is configured to perform active distance measurements. In some embodiments, the active sensor is non-controllable, and provides a fixed raster scan of a scene divided into a fixed grid. In other embodiments, the sensor is controllable, and can be commanded to perform distance measurements on demand, such that the measurement list can be updated from scan to scan, and directed to specific directions to determine the distance of the vehicle from points of interest in the scene. In an embodiment, the active measurements are completed using sensors equipped with emitting and detection electromagnetic waves, such as a LiDAR or radar. The distance measurement can be computed based on the travel time from the wave source to the target, e.g., a pedestrian, and back, i.e., when the reflected wave is detected. The sensor can be realized as a time-of-flight (TOF) method, modulation phase delay detection, using a LiDAR or radar. In another embodiment, active sensor 220 can be realized as, but not limited to, an active triangulation, a structured light, and the like. In another embodiment, the passive sensor 230 can be one of a pair of sensors producing distance information using stereovision.

Figure 4:
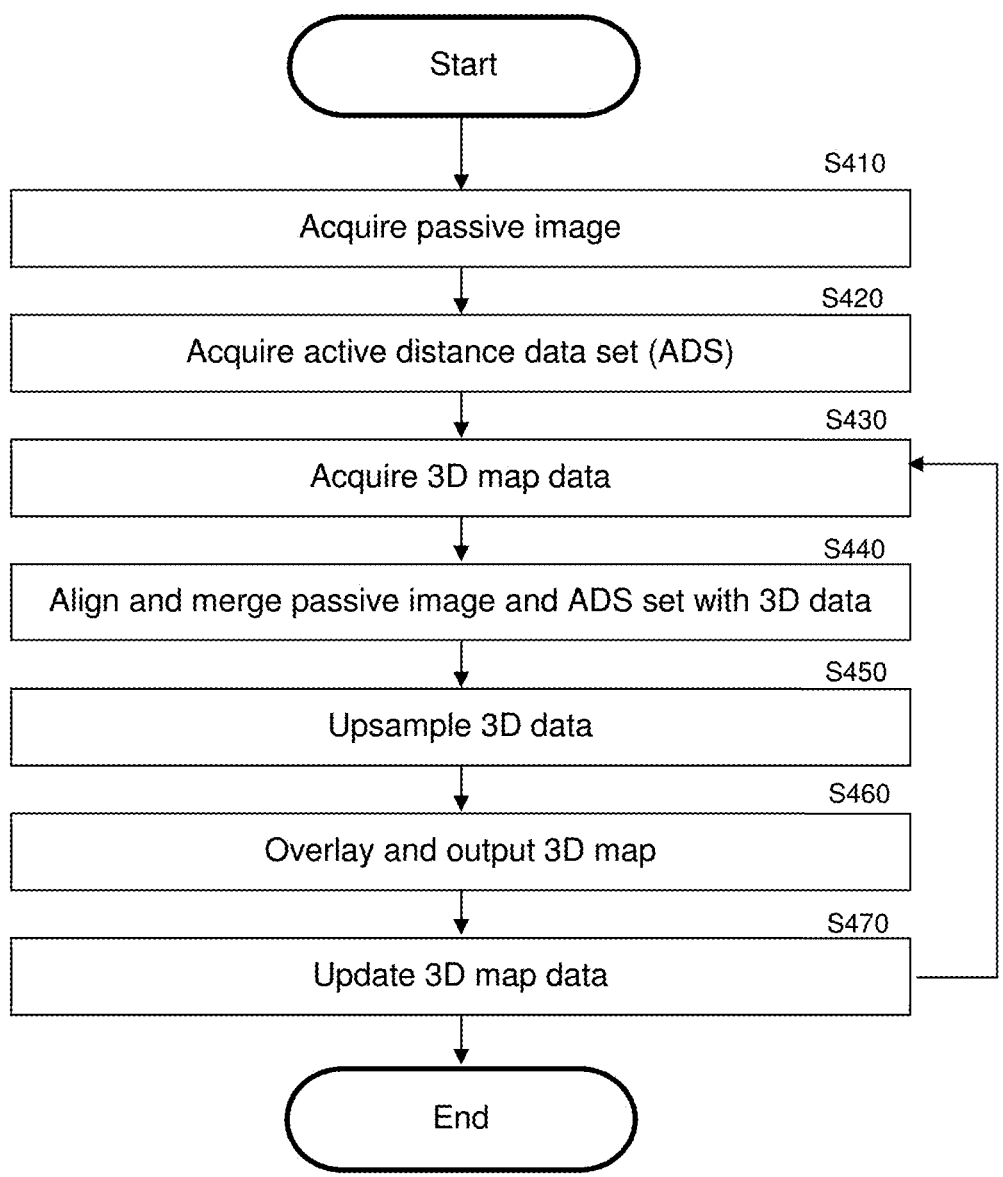
FIG. 4 is a flowchart illustrating a method for generating a 3D map according to an embodiment.

The processing and control system 210 is configured to execute the method described in FIG. 4. It is configured to process data (e.g., distance measurements, intensity level, direction of the emitted or reflected beam) in order to generate a 3D map of the entire surrounding or visible environment or of certain objects within that environment. The processing and control system 210 is designed to handle video-rate input and output at a low latency. As part of the process, the processing and control system 210 is configured to control all motion sensors 250, synchronize between them, and send sensor specific commands to respective sensors. In some embodiments, the processing and control system 210 is configured to send lists of sensor-specific requests to each controllable sensor, including lists of points of interest or regions of interests where an active distance measurement or passive image acquisition is to be performed during a next acquisition cycle. As will be discussed below, the number of active measurements can be acquired on a specific set of points and/or directions in the scene during an initial scan, through analysis of the image or images acquired by the passive sensors 230. In an embodiment, in order to create a high-density 3D map, additional information, such as previously acquired images or previously generated 3D maps and previously determined active measurements and/or sensory information gathered from the motion sensors 250, may be utilized. The motion sensors 250 may include, but are not limited to, a global positioning system (GPS), an accelerometer, a proximity sensor, an odometer, and the like. The additional information together with the active and passive sensor measurements can be utilized by the processing and control system 210 to determine a size of an object within the scene, its speed, and its direction relative to a vehicle.

In an embodiment, the processing and control system 210 is a computing unit including a central processing unit (CPU) and a graphics processing units (GPU) in order to support the video rate image processing. In other embodiment, the processing and control system 210 contains optimized software libraries such as OpenCV, CUDA® CUDNN, ImageWorks, and the like. In other embodiments, the processing and control system 210 is designed for executing Artificial Neural Networks, especially Deep Neural Networks (DNN), Convolutional Neural Networks, and the like, for fast and accurate execution of object detection, classification and semantic segmentation. In another embodiment, the processing and control system 210 is an automotive grade, low power high-performance computing system such as the Nvidia® PX family. In some embodiments, the processing and control system 210 and the implemented software thereon are designed to acquire video rate passive and active data, such that the passive sensor acquires high-density data using a high definition image sensor. To this end, video data rate exceeds 10 frames per second on the passive sensor and 5 scans per second on the active sensor. In an embodiment, the high-density format exceeds 10 pixels per degree angle.

According to certain embodiments, the processing and control system 210 is configured to generate high-density 3D maps in real-time. To this end, the processing system 210 may be configured to fuse active and passive measurements; analyze the 3D map and image to create a list of stationary and moving points of interest; determine stationary or nearly stationary features, segments and objects; actively measure the distance only from features, segments or objects of interest, such as e.g., moving objects; and estimate distance from features, segments or objects.

The fusion of active and passive measurements may include utilizing the active sensor 220 to measure locations where the passive sensor 230 cannot provide a reliable measurement. Whether the passive sensor 230 can provide a reliable measurement for an object may be based on, but not limited to, a classification of the object, a visibility of the object in the image, and the like. In an embodiment, if a reliable passive measurement can be achieved, the active sensor 220 is not utilized. Thus, the disclosed embodiments may significantly reduce the number of active measurements need to be performed by the active sensor 220.

As such, fewer laser beams or other active sources may need to be utilized, thereby reducing energy consumption, crosstalk, and hazardous conditions, as well as achieving higher resolution. In an embodiment, the apparatus 200 can be configured such that only suspicious targets, such as points, features, segments or objects, will be actively measured using the active sensor 220. A suspicious target may be any target that requires active measurement to accurately generate a map based thereon. The analysis, classification of targets, and priority decisioning is discussed below. A target may require active measurement if, e.g., the target a non-stationary (i.e., moving) and/or in close-proximity to the apparatus 200. As an example, if the apparatus 200 is mounted on a car, pedestrians will be considered as suspicious objects while trees in the background are not.

In an embodiment, the processing and control system 210 is configured to determine which object is stationary or near stationary based on images provided by the passive sensor 230. For example, using image recognition, the processing and control system 210 may be configured to determine stationary objects such as, e.g., a house, a tree, a pole, etc. In a further embodiment, when the passive sensor 230 is fixed, the processing and control system 210 may be configured to determine if an object is stationary by comparing two consecutive images and determining which objects have been moved relative to stationary objects, based on the comparison. As an example, if the passive sensor captures images from a stationary vehicle, consecutive images may be compared to determine whether any objects in the captured scene have been moved relative to stationary objects.

In yet a further embodiment, determining whether features or objects are stationary may be based on comparisons of frames (e.g., images) captured by the passive sensor 230 at different times. The comparisons may include, but are not limited to, determining changes in distances between sets of points or features in the frames, and using the motion data to estimate the motion induced change of position of those points or features. In an example embodiment, each distance change between two points may be equal to a difference between the 3D distance to the points as seen in a first frame with the 3D distance between the points as seen in a second frame. Any point that is determined to have moved may be associated with a non-stationary object. In an embodiment, an object may be determined to have moved if, for example, a sum of all distance changes of points belonging to the object is above a predefined threshold. In another embodiment, an object may be determined to have moved if the sum of distance changes related to the point is greater than the sum of distance changes related to each of the other objects above a predefined threshold. In yet another embodiment, an object may be determined to have moved if a distance change related to an object in a subsequent frame is greater than a distance change related to the object in a prior frame above a predefined threshold.

In an embodiment, the processing and control system 210 is configured to analyze the passive images and high-density 3D map in order to generate lists of sensor specific locations for measurements to be passed to each active sensor 220. The sensor-specific lists take into account specific sensors' data, stored in the storage 240. The sensor data includes, for example, sensor specifications such as range and field of view; sensor characteristics such as beam size, angular position accuracy, target relative speed, and dead time between measurements; and sensor limitations such as saturation by direct sun light, degradation during rain snow, fog, and the like; side-lobe, and ghosts angles; and the like. The processing and control system 210 is configured to take the sensors' data into account while splitting the points of interest for active distance measurement into separate lists for separate sensors.

Figure 2B:
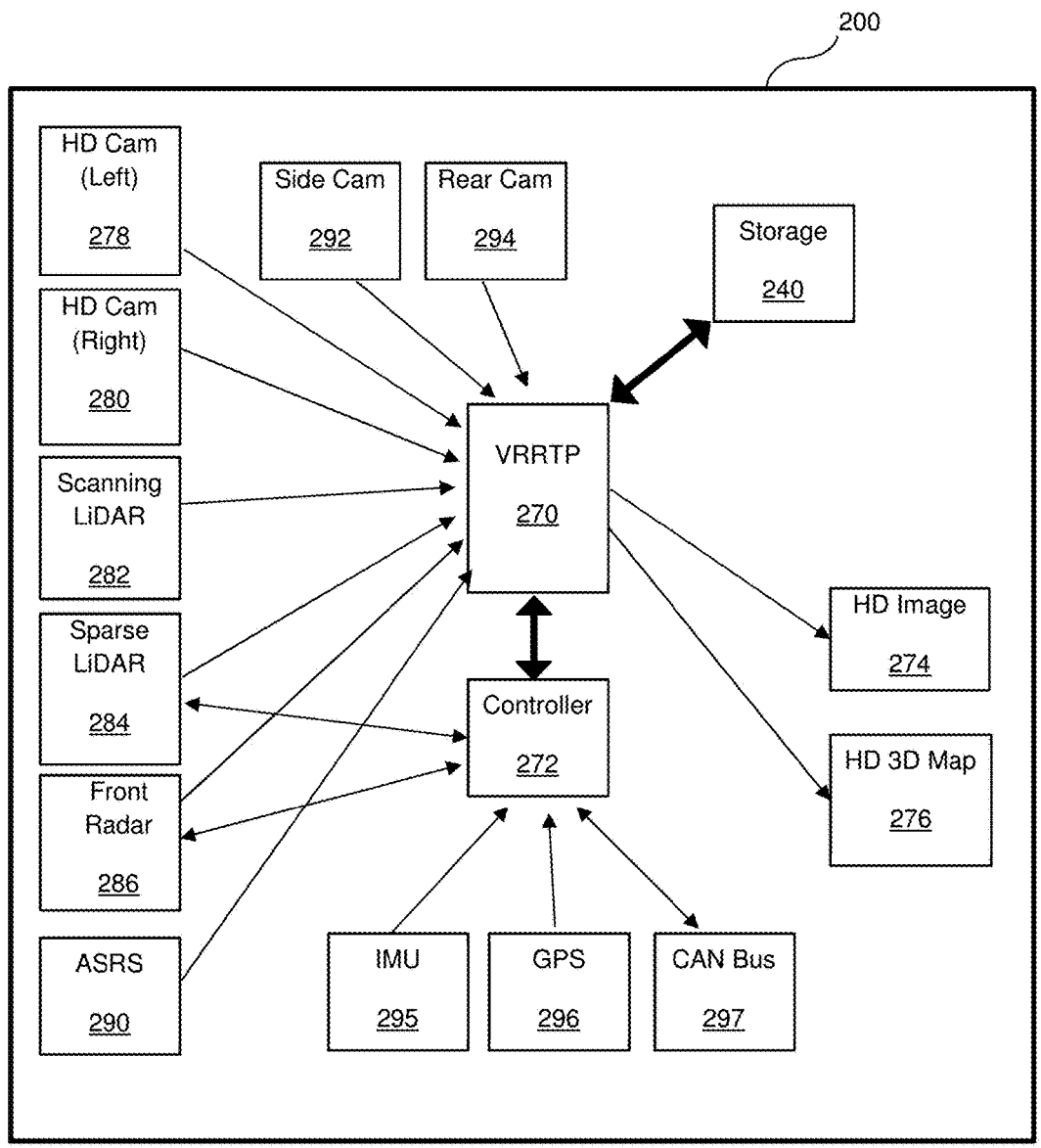
FIG. 2B is a block diagram of exemplary sensors for an apparatus configured to generate 3D maps from a vehicle according to one embodiment.

A diagram of an example of the apparatus, including sensors, connectivity and data flow, according to an embodiment, is described in FIG. 2B. The apparatus is centered around a video-rate real time processor (VRRTP) 270, configured for real time execution the processing of the method described herein. In an embodiment, the processor 270 can provide a low latency, real-time updated, high-density 3D map 276 and a high-density image 274 at an output rate of above 5 per second. In another embodiment, the processor 270 can support input sensors at acquisition rates exceeding 60 frames per second, and provide a real-time updated high-density 3D map 276 plus high-density image 274 at an equivalent output rate.

The apparatus of FIG. 2B contains one or more front facing high-density passive camera sensors 278, 280; a low-density active LiDAR sensor 282 configured for scanning around the vehicle at 360 degrees; a front-facing low-density active sparse LiDAR sensor 284 configured for focused measurements on targets of interest; side passive camera sensors 292 and back passive camera sensors 294 configured for generating 360 degree imaging when combined with the front cameras 278, 280; a front-facing long-range low-density active radar sensor 286 configured for the detection of range and speed of objects in front of the vehicle; back and side short-range low-density active radar sensors configured for detection of nearby objects around the vehicle; acoustic short rate sensors 290, arranged to cover all sides of the vehicle and used to detect nearby objects and obstacles. The apparatus also includes a GPS receiver 296; an Inertial Measurement Unit (IMU) 295, including acceleration sensors, leveling sensors, gravity sensors, gyroscopes and the like; connection ports to a vehicles such as a CAN bus 297 for input and output, including receiving the car speed and steering information from the vehicle onboard system; a storage 240 containing the code for implementing the disclosed method and the sensors' data where the configuration, calibration, specifications, performance and limitations of each sensor are stored; a controller sub-section 272 which controls the sensors, handles communications and input and output procedures, high-speed connections for transmission of the sensors data and the output data (not shown); the output of high-density images 274 and a high-density 3D map 276 and high-density cognition data can be transmitted to the vehicle's driving control system at high data rate.

According to an embodiment, some of the passive sensors in FIG. 2B are controllable, and lists of regions of interest (ROI) within the image are referenced to control the acquisition on the next frame. According to an embodiment, the ROI of the passive image sensors 278, 280 can be defined along with binning size to reduce the size of the output image. According to an embodiment, the ROIs of the passive sensors 278, 280 can alternate between un-binned small ROI around a narrow field of view (FOV) enclosing the road in front and a binned wide FOV enclosing the full FOV of the sensor. The lists of ROI can be updated according to a video frame rate, from frame to frame or cycle to cycle. Some of the sensors may be synchronized such that frames or measurement cycles are acquired synchronously. In a further embodiment, internal clocks of each of the sensors and the processing unit 270 are synchronized through control commands. Each distance measurement for each frame acquired may contain a time stamp of the measurement time, allowing for the temporal alignment of the acquired data. The time synchronization and reports may provide an accuracy of better than 100 microseconds.

Figure 3:
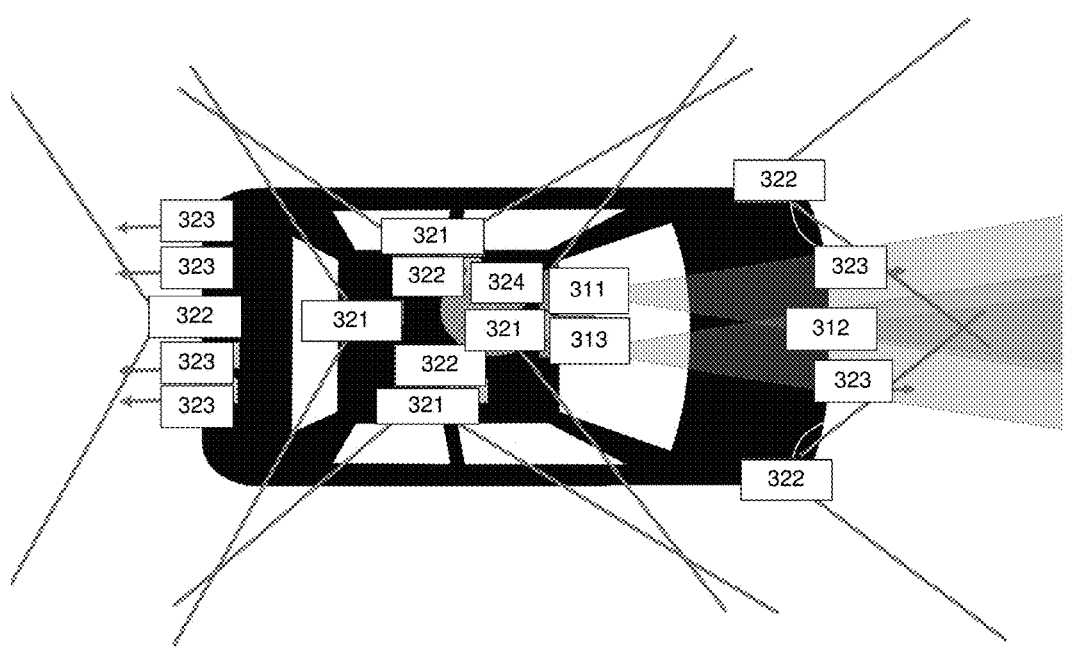
FIG. 3 shows an illustration of the placement of sensors on a vehicle configured to generate 3D maps according to one embodiment.

FIG. 3 is an illustration of the placement of sensors configured to generate 3D maps from a vehicle according to one embodiment. A front camera 311 and a front-facing LiDAR 313 may be placed near the rear-view mirror area of a windshield to provide a desirable view along the driving direction. The front camera 311 may provide either a mono or stereoscopic high-density, high resolution and high data-rate image acquisition. Wide angle fish-eye cameras 321 may be placed around the perimeter of the car, possibly facing slightly down, to provide a desirable angle for car parking, lane detection, detection of vehicles in adjacent lanes, and the like. The 360 degree LiDAR 324 may be placed on a special bracket above the car. Such placement may enable the 360 degree view around the car, possibly at low density coverage. A front-facing radar 312 may be placed on the car bumper to provide accurate distance and speed measurements to objects in front of the car, covering both short and long ranges. Additional radars 322 may provide surround location and motion information on the objects around the car. The ultrasound (US) acoustic sensors 323 may be placed on the car bumpers and on the car sides to provide the best distance estimates for a parking car in distances and angles that may be otherwise blind to the other sensors, as well as nearby object detection at the car sides during forward and reverse driving.

FIG. 4 is a flowchart illustrating a method for generating a 3D map according to an embodiment. The method is an iterative process, where the inputs streams of high-density images from passive sensors and low-density distance measurements from active sensors are processed to generate an output stream of joint high-density 3D map and high density 3D images. The process starts at S410 by acquiring a passive image, such as an image created by the camera optical sensors 278 and 280 of FIG. 2B. Next, at S420, an active distance data set (ADS) is acquired from an active sensor, such as the LiDAR sensors 282, 284 of FIG. 2B. The ADS may include the distance and speed information each point along a grid imposed on an image. Additionally, the ADS may include distance and speed information regarding various ROIs identified within the image, e.g., vehicles or pedestrians.

At S430, 3D map data is acquired for the scene. This data may be received from, for example, a storage that includes data calculated from previously captured images and information.

At S440, the 3D map data is then aligned and merged with the newly acquired distance data set. The alignment takes into account a motion transformation, such as the momentary 6-axis motion between subsequently captured frames of the high-density images, including the speed and acceleration vectors and the difference of the time stamps between a first frame and a second frame. The alignment updates the previously acquired 3D map such that every 3D point in the map shifts by a small amount dictated by the speed and acceleration values in order to accurately represent the position of the measured points relative to the new position of the vehicle at the time of acquiring the new passive image. The aligned previous 3D map points are merged with the newly acquired distance measurements in a process that discards points that fall out of the acquired range and adjust the accuracy to old points.

At S450, the updated 3D points are then upsampled to generate a high-density 3D map at the resolution of the acquired high-density passive image. Finally, at S460, the resulting 3D map is overlaid on the image to generate the joint output. The upsampling process, in the simplest case, implements a simple linear interpolation using nearby measurements. In an embodiment, if new distance measurements from active sensors are acquired at different time than the image from passive sensors, then the distance measurements follow the same alignment/propagation process to match the position of the car at the time of acquiring the passive image. It should be noted that the propagation may be either forward or backward in time, depending on the time between the active measurement and passive measurement.

Figure 5:
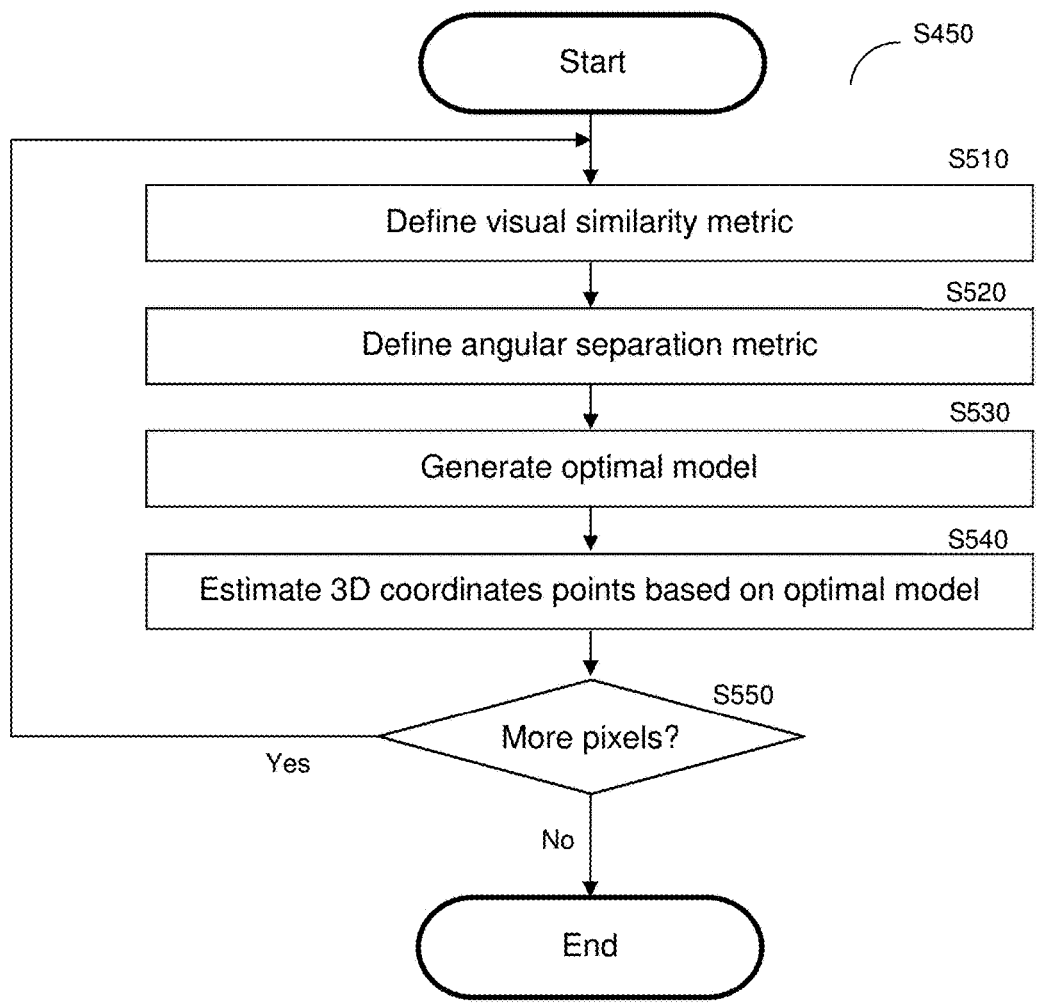
FIG. 5 is a flowchart describing an upsampling process according to an embodiment.

FIG. 5 is a flowchart describing the upsampling process S450 from FIG. 4, according to an embodiment. In FIG. 5, the process occurs at a pixel level, and is repeated for every pixel of interest in the high-density image.

At S510, the high-density 2D image from a passive sensor, e.g., image 274 from sensors 278 and 280 in FIG. 2B, is analyzed in a pre-defined neighborhood of a pixel of interest by applying a similarity metric to test the visual similarity between each neighboring pixel of a tested pixel. The 3D map data acquired at S430, after being aligned and merged at S440, is analyzed by testing multiple models for the distribution of the 3D measurements in the vicinity of the tested pixel, and selecting the optimal model per pixel. At S520, all neighboring 3D points are taken into account within a predefined neighborhood; however, each point is weighed according to a calculated angular separation metric. Each model for the distribution of 3D measurements is fitted against two versions: one using only angular metric weights; the other using both angular and visual similarity metrics. For each model, an error is estimated after the fitting.

At S530, the optimal model is generated based on comparing the errors and applying selection logic accordingly. Finally, at S540, the selected model is used for interpolating and calculating the upsampled 3D value for the tested pixel.

At S550, this process is repeated for all pixels of interest that remain. If no pixels remain to be analyzed, the upsampling is completed, and the output is the up-sampled high-density 3D map.

In an embodiment, the similarity metric S510 is performed on a color RGB image. In another embodiment, the similarity metric is performed on a grayscale image. In an embodiment, all pixels in the image are defined as "pixels of interest". In yet another embodiment, the image and 3D map pass a preliminary processing step before entering the upsampling process of FIG. 5, where pixels are identified as pixels of interest based on multiple criteria, such as: the non-existence of 3D measurement related to the pixel; existence of measurement values for the pixel, but the values contain large inaccuracies or low validity values; and the like. In an embodiment, the upsampling is carried out at subpixel resolution to match the exact center or other predefined position inside the pixel. In an embodiment, one of the models tested in S510 is fitting to a plane, and the output contains the plane normal vector. Such a plane may indicate a road surface, a wall or the surface of a vehicle. In an embodiment, one of the models tested in S510 is fitting to a random cloud of points, and the output contains the size of the cloud. Such a cloud may indicate a tree. In an embodiment, one of the models tested in S510 is fitting to a curved surface. Such a curve may indicate a rounded object or vehicle surface. In a further embodiment, two or more interpolated values are calculated in S510 from two or more models, such as plane model with and without a visual similarity metric. Such cases are required for later processing of the results to identify surfaces with non-similar patches that belong to the same object or surface, as in the case of road marks and multi-colored objects.

Figure 6A:
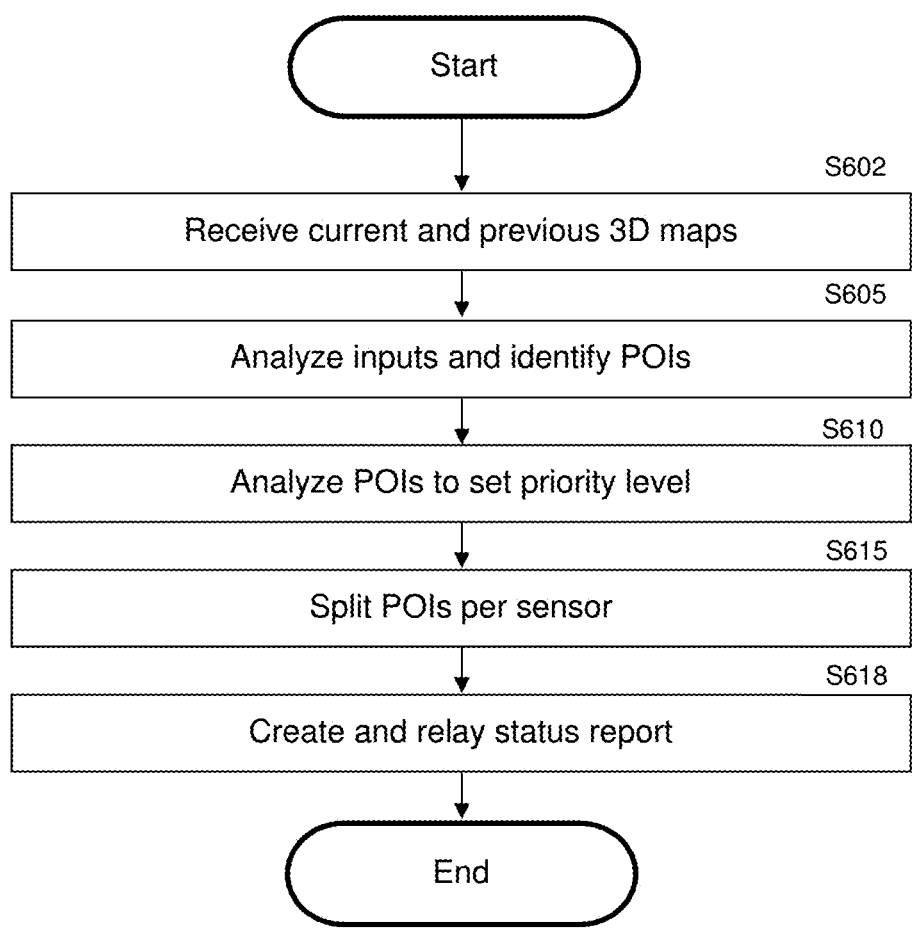
FIG. 6A is a flowchart of a high-level method of generating points of interest.
Figure 6B:
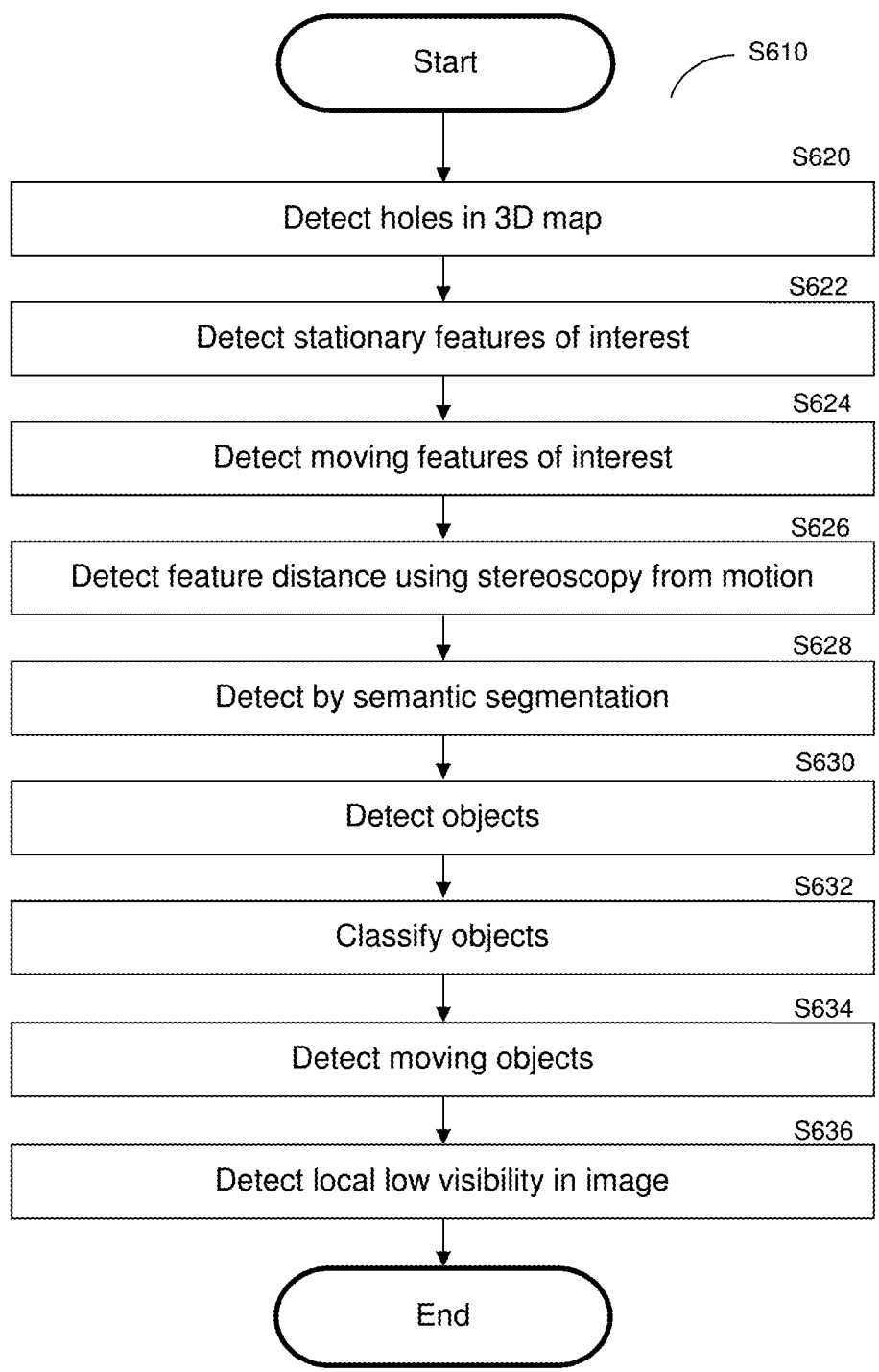
FIG. 6B is a flowchart of a method of analyzing the input maps in order to identify points of interest and their respective categories and priority levels S610 according to an embodiment.
Figure 6C:
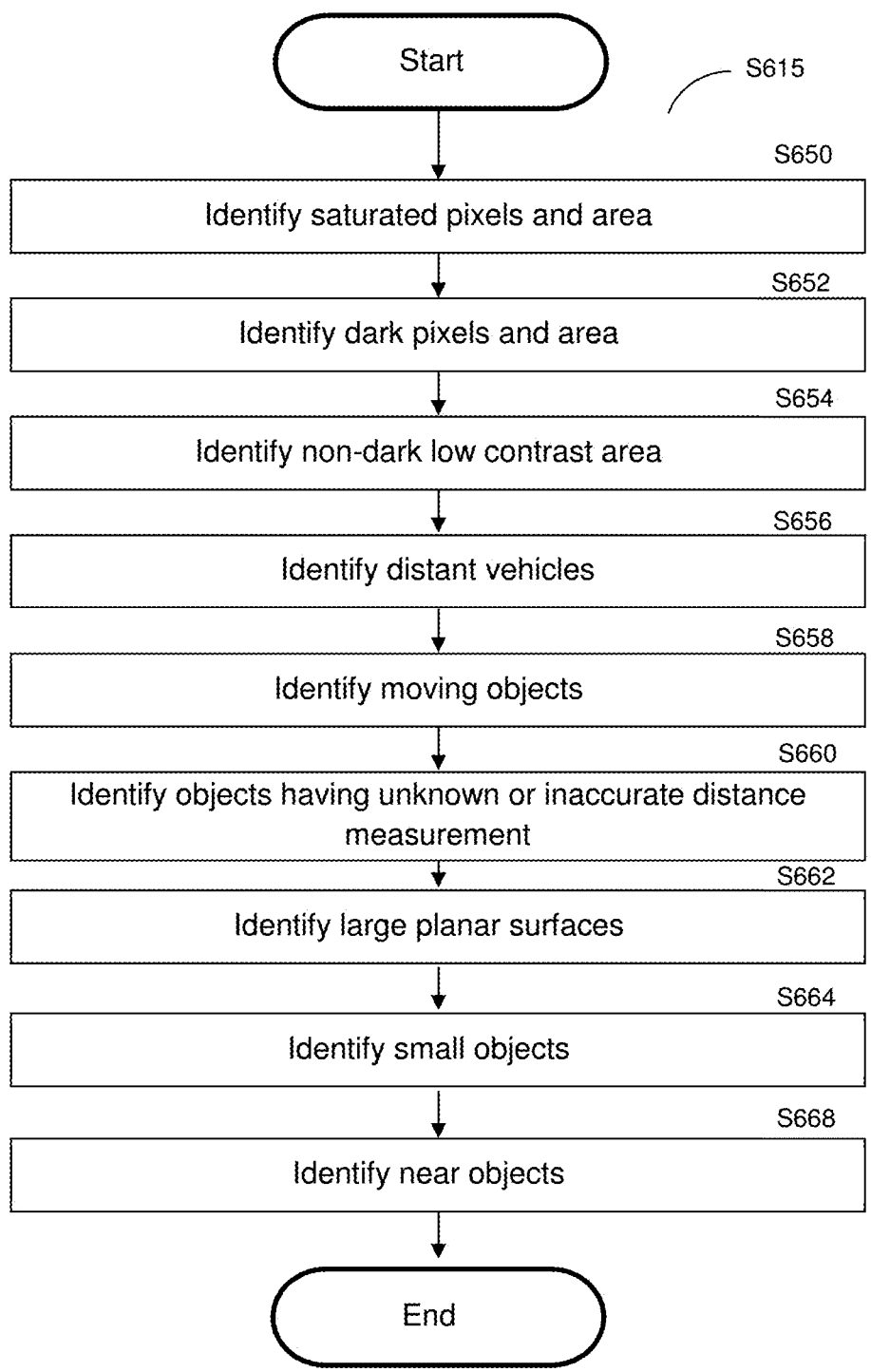
FIG. 6C is a flowchart of a method of splitting identified points of interest per available controllable sensor according to an embodiment.

FIGS. 6A-6C are flowcharts representing the method of generating points of interest (POI) and requests lists for each active sensor according to an embodiment. In FIG. 6A, a high-level method is shown. At S602, the POI generation process receives, as an input, the current maps of a scene, including a high-density 3D map and a 2D image, as well as previously stored maps, such as accessed from a storage. At S605, the input maps are analyzed to identify POIs as explained in FIG. 6B. The POIs are then analyzed to set priority levels for each POI at S610. Finally, at S615, the POIs are then split per available controllable sensor, based on an input data of sensor characteristics. At the end, the requests are ready to be transferred to each controllable sensor. The analysis to set priority level (S610) is performed by allocated pre-defined priority levels to each category of POIs, and sorting the detected POIs by category. In an embodiment, the POI list is a list of angular-coordinates. In another embodiment, the POI list is an angular map where each pixel is given a priority level. In another embodiment, the POI list is a list of rectangular regions of interest (ROI). In an embodiment, the priorities of different categories for a specific POI are joined using a predefined mathematical formula such as adding, multiplying, and selecting the maximal value.

At optional S618, special situations are detected and reported as a status report to the host driving system. In one embodiment, the status report may be an alert of low-visibility conditions. In another embodiment, the status report may be an alert of a malfunctional sensor.

In another embodiment, upon detection of malfunction conditions, the host driving system or human driver are notified by an alarm message, to inform the driving system to drive slower to allow the remaining sensors sufficient time for safe detection of obstacles and road.

FIG. 6B is a flowchart for a method of analyzing the input maps in order to identify POIs and their respective categories and priority levels S610 according to an embodiment. Each category is a unique identifier that keeps record of the method that was used to identify each POI. One example of a POI identification analysis, according to an embodiment, is by identifying "holes" of missing data in the high-density 3D map (S620). These holes may be the outcome of having no distance data at a predefined angular distance from the specific point, of from having an interpolated result with a high estimated error or low significance value.

At S622, a further example of POI identification analysis, according to an embodiment, includes detecting features of interest in the image, such as edges, patches, visually distinguishable segments or super-pixels. At S624, moving features of interest within the image are detected, such as moving edges, moving key-points, moving scale-invariant feature transform (SIFT) or moving patches.

At S626, POI identification analysis may further include detecting the distance of features or objects using stereoscopy from motion process in the image. This involves using two images captures from the same sensor at two close points in time, or using two images generated at the same point in time from two different sensors. Comparing such images allows for the calculation of the distance of the object or feature.

A further example of POI identification analysis, at S628, involves detecting objects and extended objects through semantic segmentation of the 3D map and 2D image, through unsupervised 3D processing or supervised trained neural network.

At S630, yet a further example of POI identification analysis includes detecting isolated objects through object detection on the 3D map and 2D image, using unsupervised 3D processing or supervised trained neural network. Additional information allowing POI selection is provided through an object classification algorithm at S632, either through supervised or unsupervised classifier. Another example of POI identification analysis, according to an embodiment, is by tracking objects from frame to frame (634) through object tracking algorithm.

At S636, the analysis for detecting POIs further includes analyzing and detecting local or global low-visibility angular regions in the passive image, or using one of the active sensors, or both. In one embodiment, regions of low visibility are identified as being too dark to contain useful information, such as unilluminated regions, dark tunnels or structure, low-reflectance targets, and the like. In other embodiment, low visibility regions are identified as being saturated. Saturation may be the result of overexposure, flare from the sun or another light source, and the like. In other embodiment, low visibility regions are identified as having intermediate intensity level, but with very low contrast and low color contrast. Such low contrast may indicate a situation of fog, rain, snow, dust storm and the like. In other embodiment, low visibility regions are identified as having strong clutter at short ranges on an active LiDAR sensor. Such conditions may indicate, for example, heavy rain or snow that reflect the pulsed light back to the sensor and which is being detected instead of the remote target. The state of visibility is analyzed and stored separately for each sensor, allowing the next method disclosed in FIG. 6C to either adjust operational parameters or modes of the sensor, or otherwise focus detection attention of other sensors in directions where one sensor suffers from low visibility. In another embodiment, low-visibility regions are identified as a malfunction in a sensor, based on the length of time the area is detected as comprising a low-visibility state. In another embodiment, radar detections are cross checked with the image in order to identify suspicious ghost detections in situations where there is no object visible at the location reported by the radar. Such ghost detections may indicate a reflection due to a side lobe of the main radar beam, and requires cross validation by a second radar beam or by a LiDAR to confirm the objects within the scene.

In some embodiments, the POI is a rectangular ROI, identified as a region requiring special attention. In one embodiment, the rectangle is defined by analyzing the 3D map to identify the angular region enclosing the road behind a specific distance, such as, for example, 50 meters from the sensor. In another embodiment, the rectangle is defined by analyzing the 3D map to identify the angular region enclosing groups of pedestrians that require more details. In yet another embodiment, the rectangle is defined by analyzing the 3D map to identify the angular region enclosing low-light or saturated light areas.

FIG. 6C describes the various steps taking in splitting the identified POIs S615 per available controllable sensor, based on the category of the POI as described in FIG. 6B and the sensor characteristics.

At S650, POIs of saturated camera image pixels are defined as locations to be measured by a radar and a LiDAR. At S652, POIs of dark camera image pixel regions are defined as locations to be measured by a radar and a LiDAR if the passive optical image provides insufficient data to accurately analyze the scene. At S654, POIs of low contrast image pixels regions are defined as locations to be measured by a radar and a LiDAR to provide additional detail. At S656, POIs of remote targets, e.g., beyond the range of one sensor but within the range of another sensor, are defined as locations to be measured by a longer-range sensor, e.g., a radar having a longer range than a LiDAR, or vice versa. At S658, POIs identified as belonging to a moving object are defined as locations to be measured by a radar or by using a specific LiDAR pattern designed to capture the object even if the motion of the object is not accurately measured. At S660, POIs identified as features of interest or objects of interest for a LiDAR are defined as locations to be measured by a LiDAR, since a distance information is missing or inaccurate. In another embodiment, ROIs of interest are defined as ROI to be measured separately by a super-high-resolution passive image sensor, if such exists with the system, since the normal resolution is insufficient for detecting or classifying the object. In another embodiment, in conditions of low visibility and cluttered LiDAR, locations on and around a low-resolution radar detection are defined as locations to be measured using a gated mode of a LiDAR, if such exists, as defined in the sensor data. At S662, POIs of large planar surfaces segment regions are defined as locations to be measured sparsely by a LiDAR, as is the case for roads, ground and walls. At S664, POIs of small objects on the road are defined as locations to be measured densely by a LiDAR. At S668, POIs of objects that are identified as being very close to the vehicle, are defined as locations to be measured by an acoustic sensor.

Further classifications may exist in determining the most appropriate and effective method of measurements for various objects. For example, POIs of large tracked moving objects are defined as locations to be measured by a speed measuring radar; POIs of dark locations are defined as locations to be actively illuminated by a controllable spotlight projector; conditions of malfunction of one sensor are defined as conditions to use other sensors in a special optimal scan mode instead of the default mode; upon identifying conditions of malfunction of a passive sensor, the LiDAR and radar will be operated in a systematic raster scanning for optimal detection, instead of measurements on demand; upon identifying conditions of malfunction of a LiDAR, the LiDAR POI's are transferred to the radar, and vice versa, and the like. Additionally, the method may include using multiple sensors to detect and analyze a single POI, as well as utilize three or more sensors for the detection of the 3D space within the captured scene.

Figure 7:
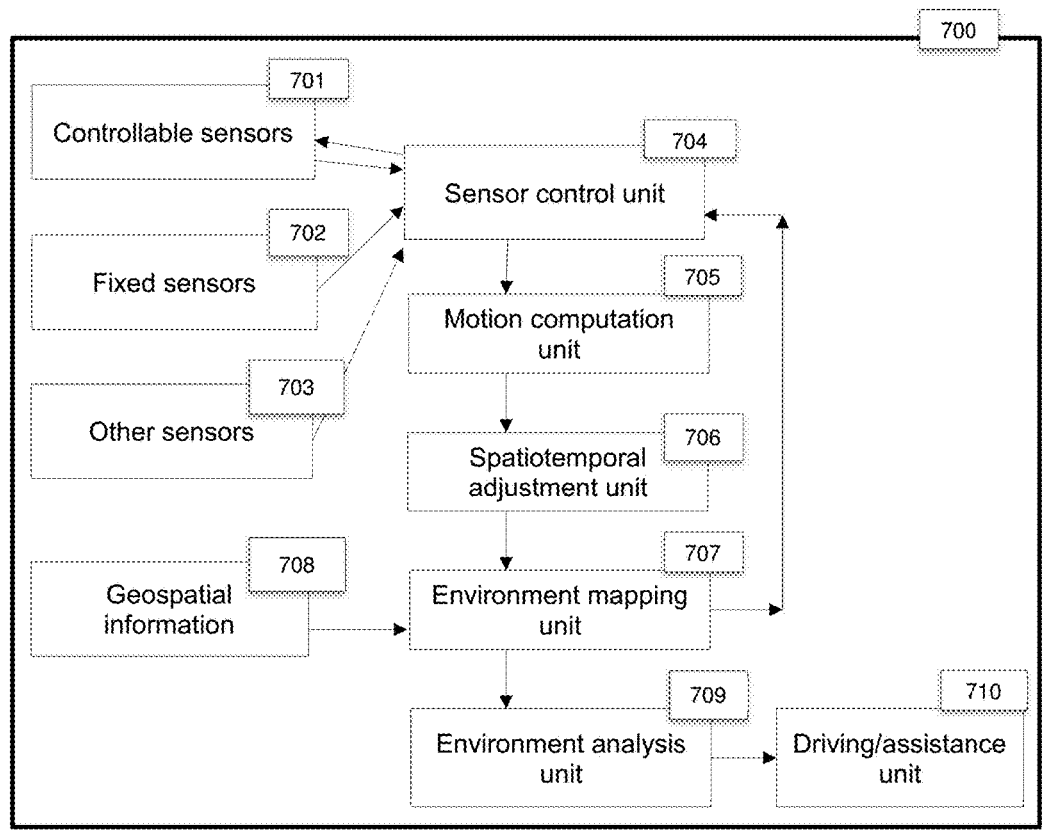
FIG. 7 is a flowchart of a method configured to generate an environment analysis from a vehicle according to an embodiment.

FIG. 7 is a flowchart of a method 700 configured to generate an environment analysis from a vehicle according to an embodiment.

The input from sensors 701-703 may be processed to generate a 3D map, which may be further processed into an environment model that can be used to generate driving instructions. The computer elements in vehicles are typically enclosed in an electronic control unit (ECU) which are subject to additional design considerations such as optimal shape factor, performance and redundancy. The units described in FIG. 7 may be further distributed into one or several ECUs based on specific application requirements. For example, the 3D map can be generated by a first ECU, the environment model can be generated by a second ECU and driving instructions can be calculate by yet another ECU. As an additional example, a front-facing 3D map and model can be generated in one ECU, while the surrounding information may be processed in another ECU. Some ECUs contain processing units with CPUs (central processing unit), GPUs (graphics processing unit), TPU (tensor processing unit) and dedicated ASIC units that can be dynamically configured to perform some of the functions in FIG. 7.

Controllable sensors 701 may be configured to acquire specific spatial segments based on the analysis of the environment. Fixed sensors 702 have a fixed FOV (field of view), and cannot be configured to point in a different direction. Other sensors 703 do not have a specific FOVs and provide some contextual information. All sensor inputs may be processed by a sensor control unit 704. Sensor control unit 704 may also be configured to control the acquisition parameters of the sensors, to send some directional commands to some sensors, and to configure the FOV for controllable sensors 701. Sensors and the sensor control unit are further described in FIGS. 8 and 9.

Sensor input streams may arrive at different times and from different spatial segments. It may be beneficial to realign multiple inputs from different sensors to common coordinates, taking position of the sensors and time of capture into account. For example, a front-facing camera FOV and time may be used as the reference point for a driving direction, while a LiDAR location and time may be used as the reference point for a model of the surrounding environment. In some embodiments, the cameras are further registered to some location and orientation central to the vehicle. Other non-image sensors, such as GPS and inertial measurement units (IMU) sensors, may be calibrated to the selected location within the vehicle and aligned using a common timestamp. A motion compensation unit 705 may compute all the relevant temporal and spatial transformations as is further described in FIG. 10.

Application of the parameters calculated in 705 may require batch processing of several frames from different sensors. A spatiotemporal adjustment unit 706 may prepare and aggregate the relevant information from a plurality of sensors for further processing. In some embodiments, the inputs of the spatiotemporal adjustment unit 706 may include asynchronous streams, while the output may be a synchronous frame. The spatiotemporal adjustment unit 706 is further described in FIG. 12.

The frame output from the spatiotemporal adjustment 706 may be further augmented via geospatial information 708 available from other sources, including maps, v2v (between vehicles or between a vehicle and infrastructure) communication, advertising and other similar information channels. We call the resulting augmented frame a "3D map" of the environment, and it may include a high-resolution map of the area, the static and moving objects in the area with relevant location and speed estimates, road and traffic signs and signals, free space available for driving segmentation and other relevant road information. In some embodiments, this information may be further modified via an environment mapping unit 707, further described on FIGS. 13-16, into the front-facing high-resolution map and surround low resolution point-cloud.

Figure 17:
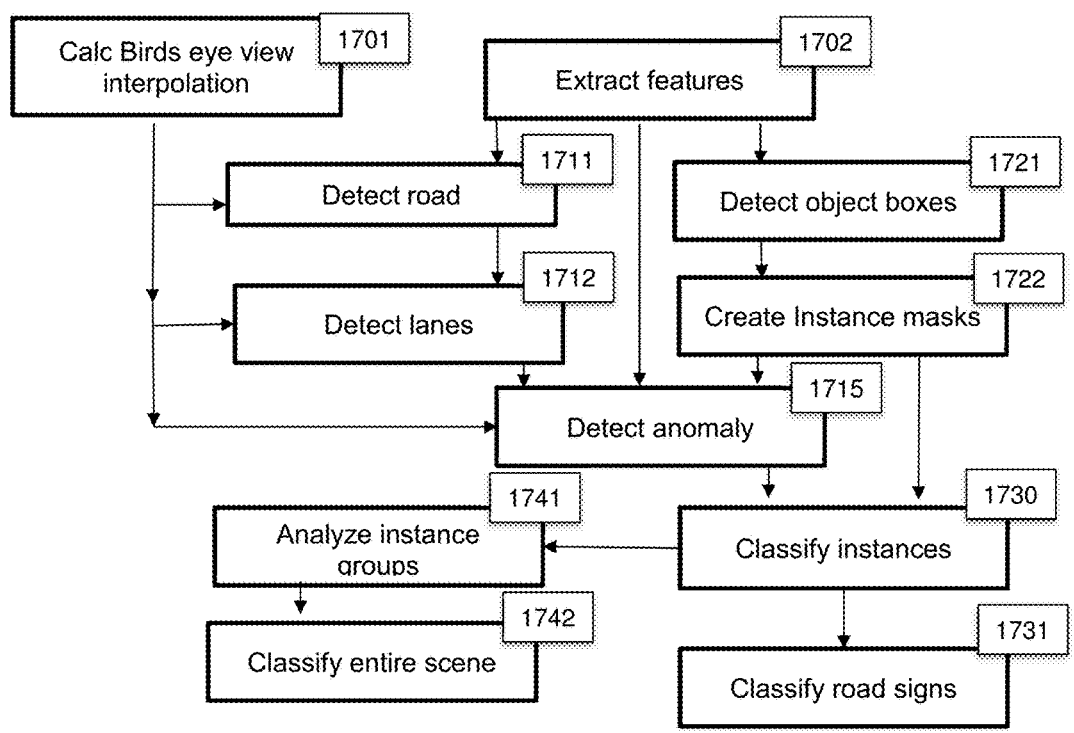
FIG. 17 is a flowchart of a method for driving direction map analysis configured to generate environment analysis from a vehicle according to an embodiment.
Figure 18:
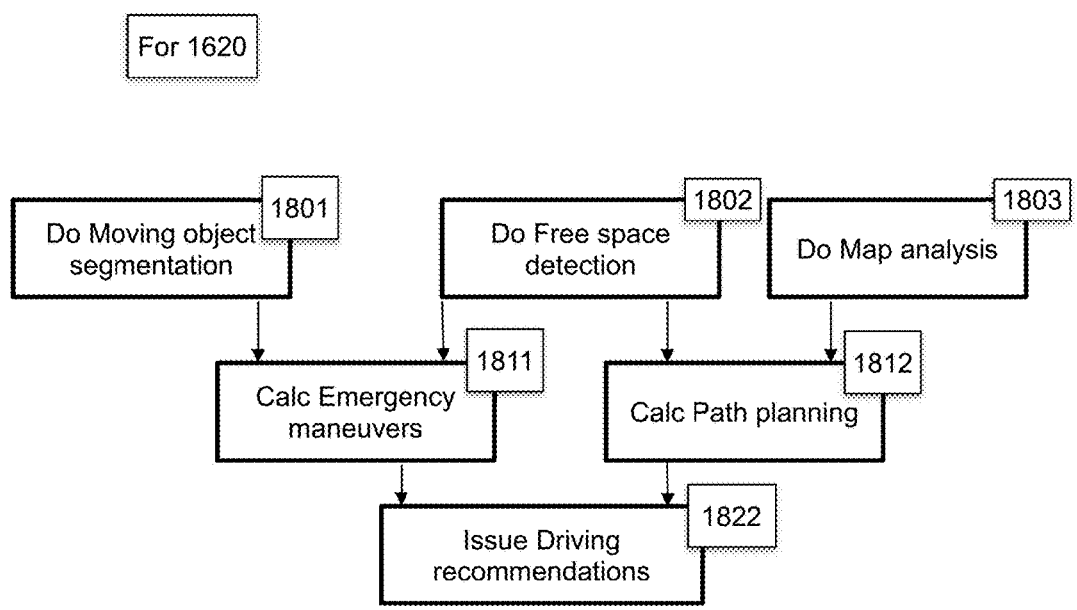
FIG. 18 is a flowchart of a method for vehicle surround analysis configured to generate environment analysis from a vehicle according to an embodiment.

The front-facing high-resolution map and surround low resolution point-cloud may be further analyzed by an environment analysis unit 709, also described on FIGS. 17-18. The environment analysis unit 709 may generate an environment model in a format that enables driving decisions and alerts by a driving assistance unit 710. In an embodiment, the environment model generated during operation can be configured to identify changes between the supplied geospatial information 708 and the actual environment as described by the actual model, and to send these changes back to the geospatial information center, to enable real-time updating of the changes made to the environment.

Figure 8:
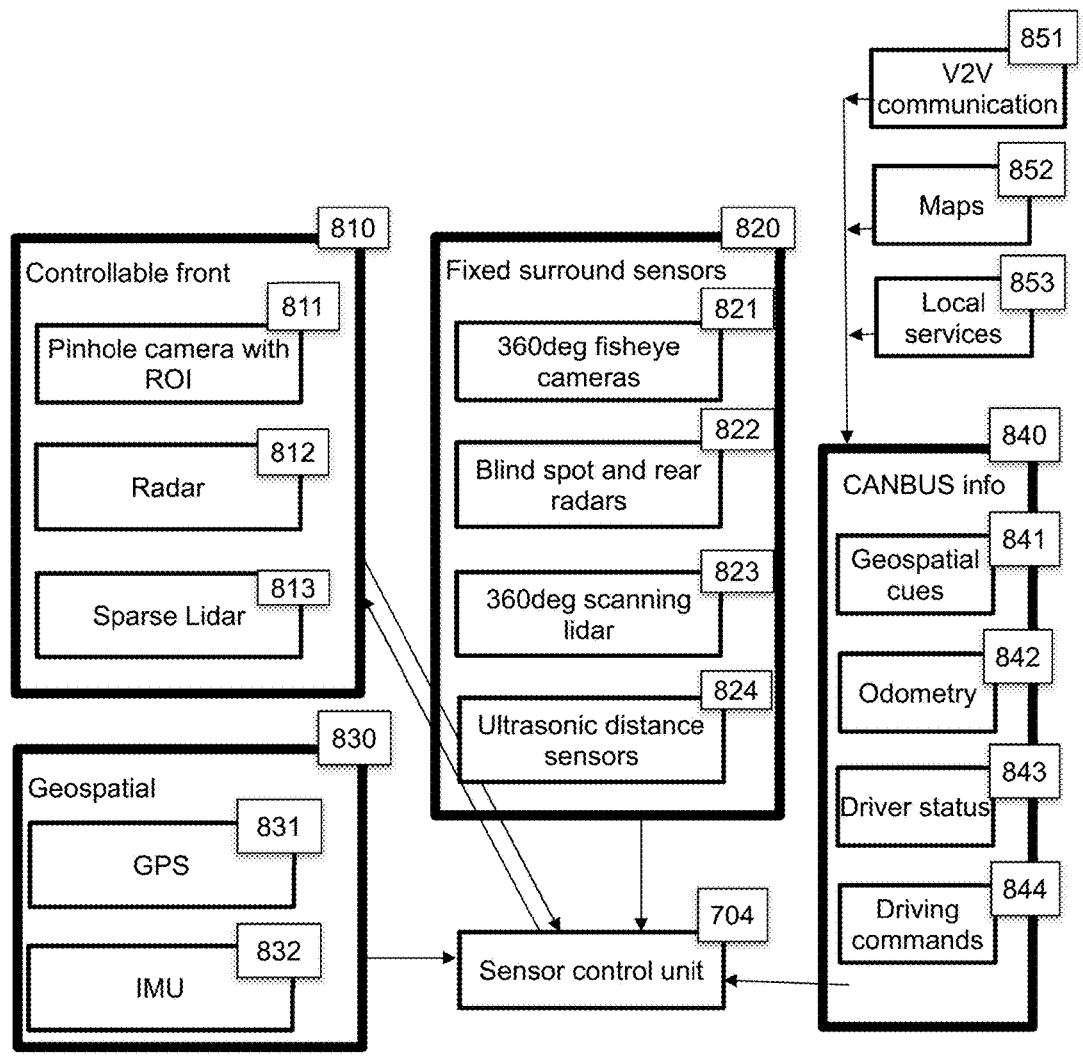
FIG. 8 is a block diagram of exemplary sensors for an apparatus configured to generate 3D maps from a vehicle according to an embodiment.

FIG. 8 is a block diagram of exemplary sensors for an apparatus configured to generate 3D maps from a vehicle according to an embodiment. In one embodiment, the controllable sensors are directed to face the driving direction, while the fixed sensors provide surround coverage at the sides and read of a vehicle.

While driving forward at high speeds, high resolution and frame rate may be required in the driving direction to provide sufficient data for scene analysis. Further, it is beneficial to have a very high-resolution image of a distant part of the road, so that there is more time for the decision-making process to occur. The decision-making process may include slowing down the vehicle, evasive maneuvers, handover of the operation of the vehicle to a human driver, scanning an area of interest in superior resolutions to further assess its properties, and other controllable actions. When driving at high speeds, small objects such as bricks may generate a significant damage while hitting the vehicle and must be properly identified.

While in theory high frame rate high resolution sensors may provide a good coverage of the road, the high price and high data rate required to produce such images can make these sensors impractical. Moreover, the resulting sampling time may be impractical in terms of energy consumption and light or radio pulse shaping.

Use of controllable front sensors 810 offers a viable solution. In some embodiments, a camera with controllable regions of interest (ROI) may be used. The controllable ROI is a feature available in some sensors than enables partial use of the sensor area and results in lower communication bandwidth. In some sensors, the integrated signal processing (ISP) board of the sensor also enables resampling and the sensor may support analog binning to increase the SNR (signal to noise ratio). In some embodiments, a thermal camera may be used for better visibility in night light. In further embodiments, RGB colors can be mixed with other spectral modalities to enable better visibility in a wide range of conditions. The mix mode of the sensors may be further controlled by a sensor control unit 704. Many ISPs come with built-in HDR (high dynamic range) mode, denoising and contrast enhancement algorithms, and may improve the image quality in deteriorating visibility conditions if instructed to do so. However, such modes may introduce artifacts reducing the effective camera resolution.

In some embodiments, a radar, such as a phase array radar 812, may be used. Phase array radars may be digitally configured to detect as some configurable one dimension or two-dimension angles, including full or partial scanning of the space in front of the vehicle. Unlike a camera sensor or a LiDAR, radar is less sensitive to rain, dust, snow and other atmospheric conditions as well as illumination. Objects can often have a different reflectivity to radio waves than to visible light and infrared spectrum. Thus, a phase array radar may generate a low-resolution 3D map of the environment in front of the vehicle that may otherwise be invisible or difficult to capture using other sensors.

In some embodiments, controllable LiDAR 813 may be used to analyze a scene. MEMS (microelectromechanical systems) LiDARs may be economical and highly configurable, and may be provide better scanning rate and angular resolution than other types of LiDARs. MEMS LiDARs can provide an accurate high frame rate, high resolution 3D mapping of the area in front of the vehicle. LiDARs with polygon mirrors may also be used for similar purposes. Operating a LiDAR in a Multiple-point per pulse mode allows LiDARs to ignore some atmospheric interference, while reducing the effective sampling rate of the LiDAR.

In some embodiments, different types of front facing sensors may be calibrated to the frame of reference of the front camera 811. This sort of registration minimizes imaging artifacts in the camera plane, enabling implementation of effective depth-aware image processing algorithms, including ego motion (three-dimensional motion of the camera) detection, object detection, road segmentation, road signs recognition, traffic lights recognition, lanes detection, pedestrian detection, obstacle detection and classification, vehicle detection and tracking, and other image processing algorithms.

Pointing algorithms may be used to configure LiDARs and radars to provide frequent and high-resolution scans of objects suspected to be important for driving decisions. Objects that are poorly lit for image sensor may be multiply sampled by LiDAR or Radar for providing more reliable reading. Pointing algorithms may balance the needs of different subsystems to provide the best viable scanning plan at each timeframe.

Fixed sensors 820 may be configured to provide surround coverage of a vehicle. These fixed sensors may further be configured to help avoid collisions directions not visible to the front sensors 810. While several fixed sensors can be used to provide full 360-degree coverage, doing so can be cost-prohibitive. Moreover, these sensors often provide a very wide FOV, resulting in reduced sampling rate and resolution.

A 360-degree scanning LiDAR 823 may be used to evaluate distances to the surrounding objects. In LiDARs such as those produced by Velodyne®, the price of the LiDAR is proportional to the number of individual sensors, which in turn is proportional to its vertical resolution. Since these LiDARs can be expensive, reducing the vertical resolution of the LiDAR 823 provides an option for reducing the overall system price.

Further 360-degree visual coverage may be provided by using several wide-angle cameras 821. For example, some embodiments use four fisheye cameras using the four principal directions. The effective resolution of the fish-eye camera may be lower in the corner areas farther away from the optical center.

The overlapping area between the camera images may be used to calibrate the intensity levels of the cameras. The cameras may be further calibrated to project the image onto a single point on the vehicle, such as the location of the LiDAR 823.

A stereo from motion (SFM) algorithm may be executed on the cameras 821, enabling depth measurement of multiple objects not directly visible by a LiDAR 823.

The vehicle may be fitted with a wide range of blind spot, collision alert and rear facing radars 822. These radars 822 may provide the distance to the closest objects in the relevant direction and the speed of these objects.

Various sensors have a minimum distance of focus due to the vertical FOV of the sensor and the dynamic range of the sensor. Ultrasonic (US) distance sensors 824 may provide distance measurement in areas not visible by other sensors, such as distances less than 1 meter from the vehicle. For example, 4 US sensors may be used in the rear of the vehicle and 2 sensors in the front to provide close object detection. The US sensors may provide slow reaction speed and low maximal distance, encouraging their primary use for parking and orientation in the space previously mapped by other sensors.

The location of the vehicle may be tracked via GPS 831, while its acceleration may be monitored via an IMU. In some embodiments, magnetometers are also used to indicate the direction of north. These geospatial sensors 830 provide additional cues to the environment model. For example, the GPS sensor 831 may eliminate drift in motion estimation and provide localization for some maps. For example, the IMU 832 sensor may indicate if the vehicle is moving, including possible bumps of the road. It may be further used to determine the stabilization of the environment map with respect to 6DOF (degrees of freedom:3 linear speeds axes, 3 rotation speed axes) vehicle movement.

Additional sensor information may be provided via CAN-BUS (controller area network bus) 840. This information may include geospatial cues 841 from external services, such as V2V communication 851, maps 852, local services and ads 853. Odometry 842 readings may supply information about the wheels of the vehicles, enabling better determination of vehicle location and speed, traction of the road estimation, the reaction speed of the vehicle mechanisms and additional parameters. Driver status 843, such as driver eye tracking, enables information about the driver, for example if the driver is not sufficiently alert to avoid a danger or receive the control over the vehicle. Driving commands 844 may be issued for vehicle turning, starting, stopping, following a path on the map, performing parking and other driving activities.

Figure 9:
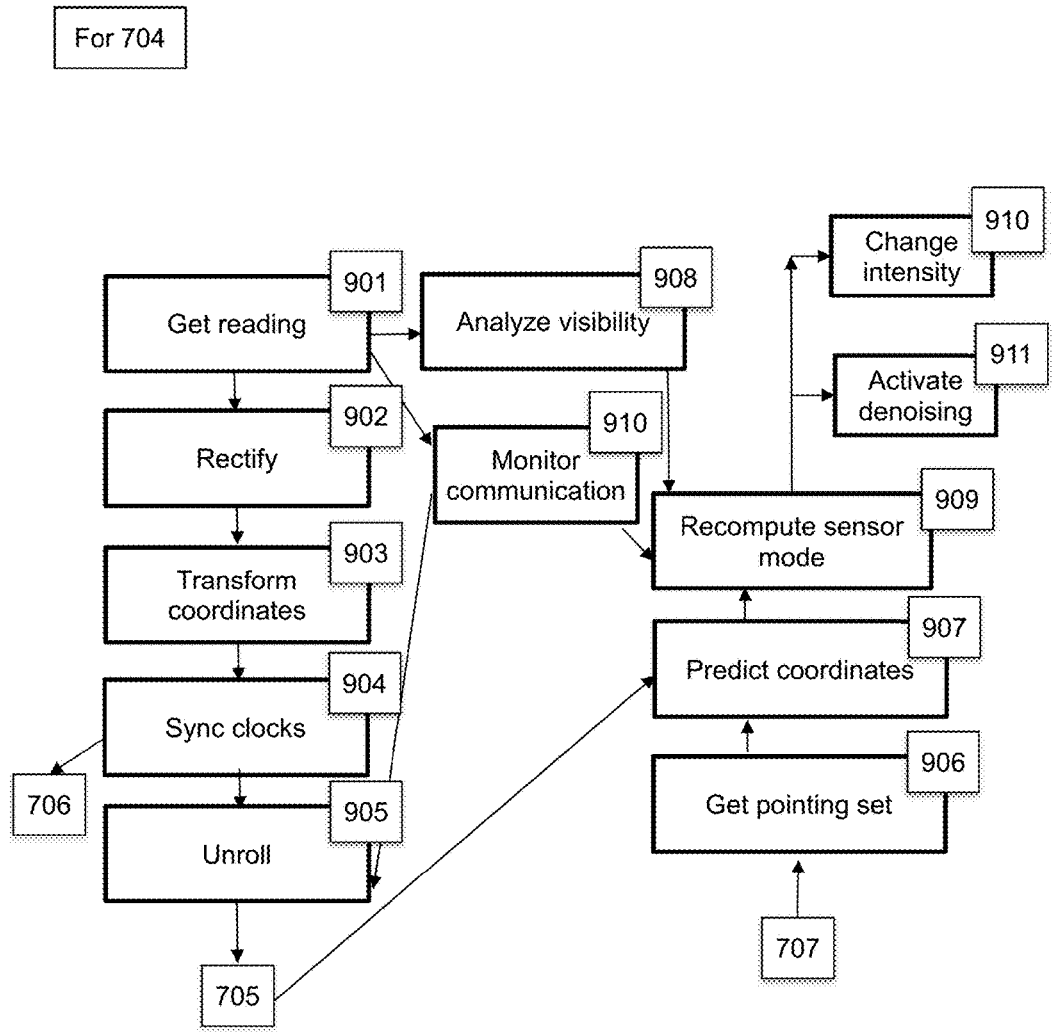
FIG. 9 is a flowchart of a method for sensor control configured to generate 3D maps from a vehicle according to an embodiment.

FIG. 9 is a flowchart of a method for sensor control configured to generate 3D maps from a vehicle according to an embodiment.

The sensor reading may be acquired from the relevant stream 901. The reading may be further rectified 902 using various calibration data. Each sensor may have internal calibration data from the measurement to the world coordinates and external calibration data to the coordinates of another sensor. Fisheye and other distortions of the cameras are corrected. Contrast and gamut correction can be applied to the cameras. Further, the coordinate systems may be transformed 903. Projective transform and 4×4 matrix may place depth data on the relevant camera and vice-versa.

Since each sensor may use a different time reference, and the whole system may use yet another time reference, the synchronization of multiple clocks 904 may be necessary to integrate various system components. This calibration may be further refined using various system readings, since a rare event should happen in all sensors approximately at the same time.

Some sensors have a slow sampling speed and provide a timestamp per reading. These sensors may require several readings to be unrolled 905 to the same time.

In some embodiments, transformations 903 and 905 may use motion estimation and provide a variable transform per sensor reading.

Some frames may become invisible when captured by certain sensors. The visibility may be analyzed 908 to determine areas of low contrast, high noise, overexposure and underexposure. For example, a minimum, maximum, mean and standard deviation reading may be calculated for values captures within an image. For example, intensity readings of a LiDAR or a radar derived image may be analyzed as such. Additionally, there may be a communication problem, such as a malfunctioning sensor, which can be determined by monitoring the communication channels 910 and determining the channels having no signal or high communication noise.

Several corrective measurements may be used in cases of poor visibility or sensor malfunction. For example, the vehicle may be instructed to slow down. Some of the corrective measures 909-911 may apply during the sensor acquisition. Namely, which sensor are to be used for image capture can be adjusted 909, the global intensity may be changed 910 and denoising algorithms (such as a non-local means) 911 may be activated.

Pointing algorithms may generate a set of pointing instructions that may be read 906, to instruct specific sampling in the areas of interest. For example, in areas of low useful signal, larger integration time may be used. In areas with larger motion, more frequent sampling employed. In areas with small objects, a denser sampling may be used for more accurate detection. These sampling points may need to be taken using predicted coordinates of the sensor 1407 after the point set creation. For these measurements 907, as well as other measurements, the sensor mode 909 may be modified for a different integration time, multiple return mode, sensor binning, high dynamic range or other mode as required.

Figure 10:
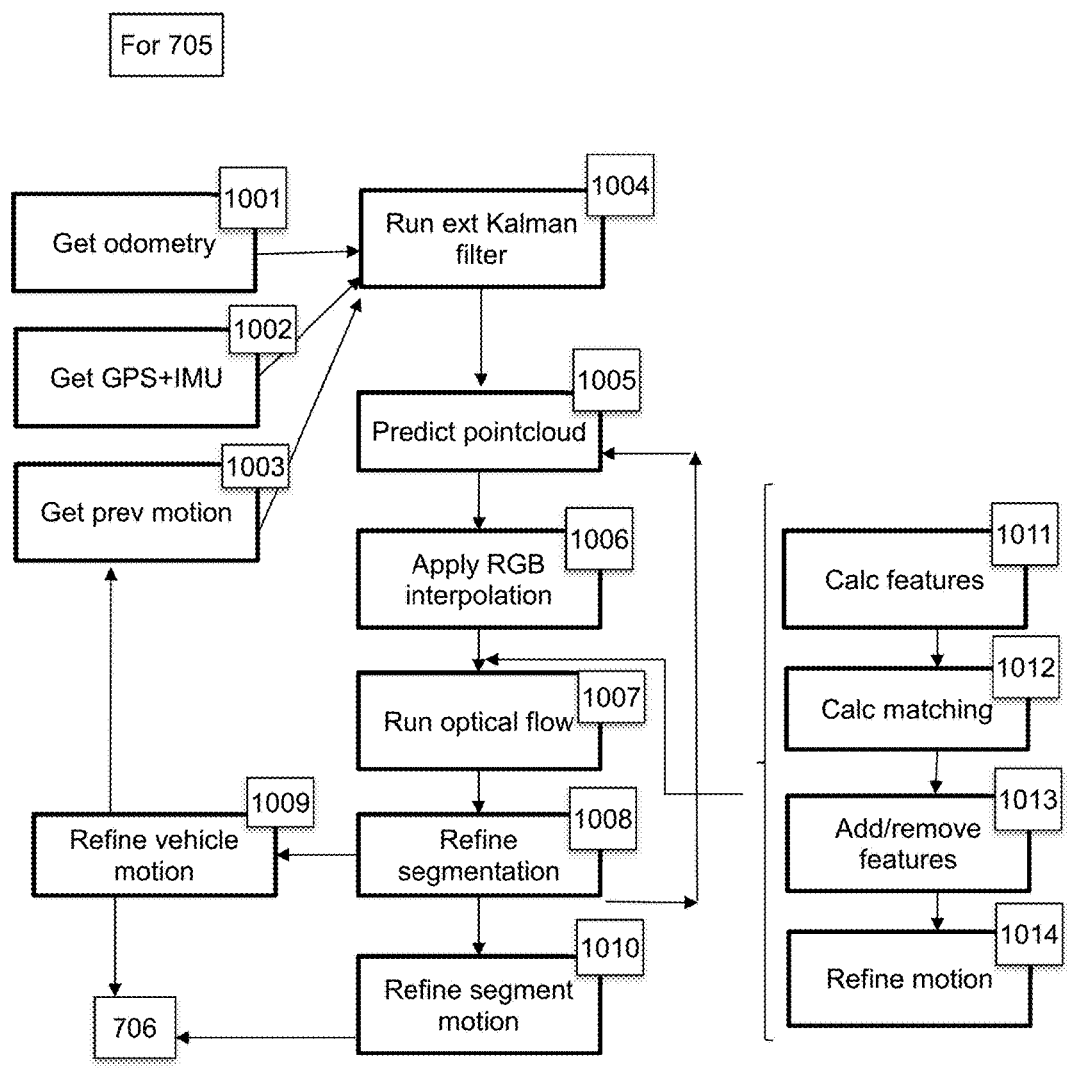
FIG. 10 is a flowchart of a method for motion compensation configured to generate 3D maps from a vehicle according to an embodiment.

FIG. 10 is a flowchart of a method for motion compensation configured to generate 3D maps from a vehicle according to one embodiment.

The vehicle motion is taken into account for accurate coordinate transformation calculations using the sensor control unit 704. The calculations may use several data sources with uncorrelated noises and a filter tuned to filter out the relevant noises. For example, an extended Kalman filter 1004 may be applied to the captured image to remove the noises of various filters adaptively. Since a vehicle can have only a limited acceleration in 6 degrees of freedom (DOF), an extended Kalman filter of the second order in the 6 DOF may be used. The filter may be further tuned to evaluate the road traction, residual calibration errors and other error functions for autocalibration, self-diagnoses and road status estimation.

The filter 1004, e.g., the Kalman filter, may access the vehicle odometry reading from the car wheels, car acceleration from IMU 1002, global position from GPS 1002. The current motion is typically predicted based on the previous motion estimations 1003. This motion may be later updated using camera and depth readings, which may be used to predict the current pointcloud 1005. The RGB image stream from the cameras may be further interpolated 1006 to the pointcloud location. These locations can be further refined using feature tracking, which may be calculated 1011 using an appropriate detector, such as a Harris, DoG or Lucas-Kanade-Tomasi tracker. These features may be characterized using SIFT, SURF, ORB, FREAK or other suitable descriptors. Descriptor matching 1012 may be used to characterize the motions of the vehicle and of other objects. Different confidence may be applied to features with depth readings and features without depth reading. If too few features are found in a given locality, additional features may be found using a different detection threshold. If too many features are found, or features are found bit do not result in a positive identifying match, the features may be ignored or removed. The feature algorithm 1013 may be analyzed for statistical behavior to predict a tracking error and adjust the motion refinement 1014 accordingly.

After global motion refinement of our vehicle 1014, there may be a need to refine motion of other objects. An optical flow 1007 may provide a direction of motion for different objects in a camera plane. This motion may be further segmented 1008 based on the detected motion of different planes within the image. The segmentation can employ optical flow, normal XYZ space, RGB color, and other parameters to detect planes of similar qualities. The vehicle motion 1009 may be further refined to exclude the moving segments. For each moving segment, its own motion model may be refined 1010. The system may track the segments and change segmentation gradually in 1008 to confirm with some physical model of the objects in the scene and their occlusions.

Figure 11:
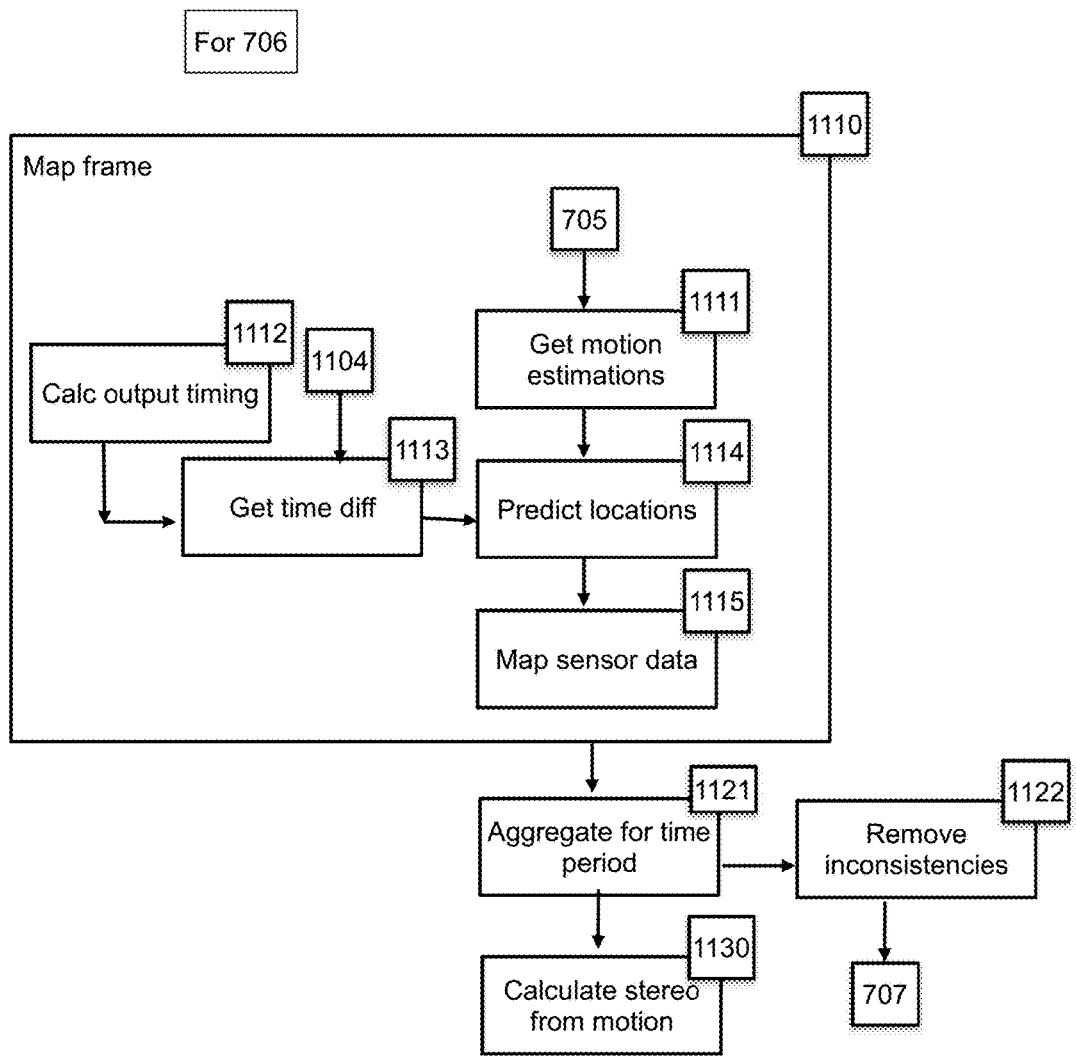
FIG. 11 is a flowchart of a method for spatiotemporal adjustment configured to generate 3D maps from a vehicle according to an embodiment.

FIG. 11 is a flowchart of a method for spatiotemporal adjustment configured to generate 3D maps from a vehicle according to one embodiment.

A frame is mapped 1110 to include relevant data from multiple streams. The data relevancy may be defined by time limits and the available FOV. Since different sensors may have different frame rates, there may be zero or a plurality of readings in a given time frame. These readings may need to be extrapolated or filtered. For example, a frame may include a camera frame, a radar reading, and a LiDAR scan mapped to the time of the camera reading.

The relevant timing is the calculated timing of the output mechanism 1112, which may correspond to the timing of the sensor of reference, such as front facing camera or 360-degree LiDAR, or may be adapted to adjust for clock jitter and frame skips.

The time difference that needs to be compensated per stream may be calculated in 1113. The motion estimations for the segments of interest may be applied 1112 to predict the locations of the given segments 1614. When remapping sensor data 1115 to the predicted coordinates, high levels of accuracy may be required. To achieve these levels of accuracy, the system may apply a plurality of interpolation methods, choosing the method with highest confidence, including naïve averaging, 3D spatial interpolation, bilateral filter using spatial and RGB features, patch match or other suitable methods. The interpolation error may generate an additional map that can be used as spatial confidence in object segmentation.

The data may be aggregated for long periods of time 1121, as long as the motion is consistent. For example, the LiDAR data may be aggregated for up to 20 frames so long as the motion is consistent. The confidence of older readings may be gradually reduced due to aggregated error in motion estimation. The newer readings with higher confidence may replace the older readings. The computation may be performed with subpixel accuracy and provide super resolution according to a calibrated point spread function and computed motion trajectory.

Any inconsistencies detected should be removed 1122, including the phenomena of background depth layers hiding behind the foreground layers. In some embodiments, separate memories for several layers of graphical information may be employed. In some embodiments, some segments may have poor reflective properties, and may be interpolated using the segment edges. In the areas of depth texture, such as trees, the depth reading may be inconsistent. The algorithm may be configured to filter out the background readings in such areas. There may be standalone depth measurement due to returns from dust and other malfunctions. These depth measurements may have no support in camera or radar readings and may be removed.

In some embodiments, stereo from motion may be calculated using the motion model of the features or image segments and after the inconsistency filtering. By using features aggregated from several readings 1121, the stereo measurement quality may be improved. This sort of stereo from motion may be used for example in the areas not covered by direct and accurate LiDAR and radar readings.

Figure 12:
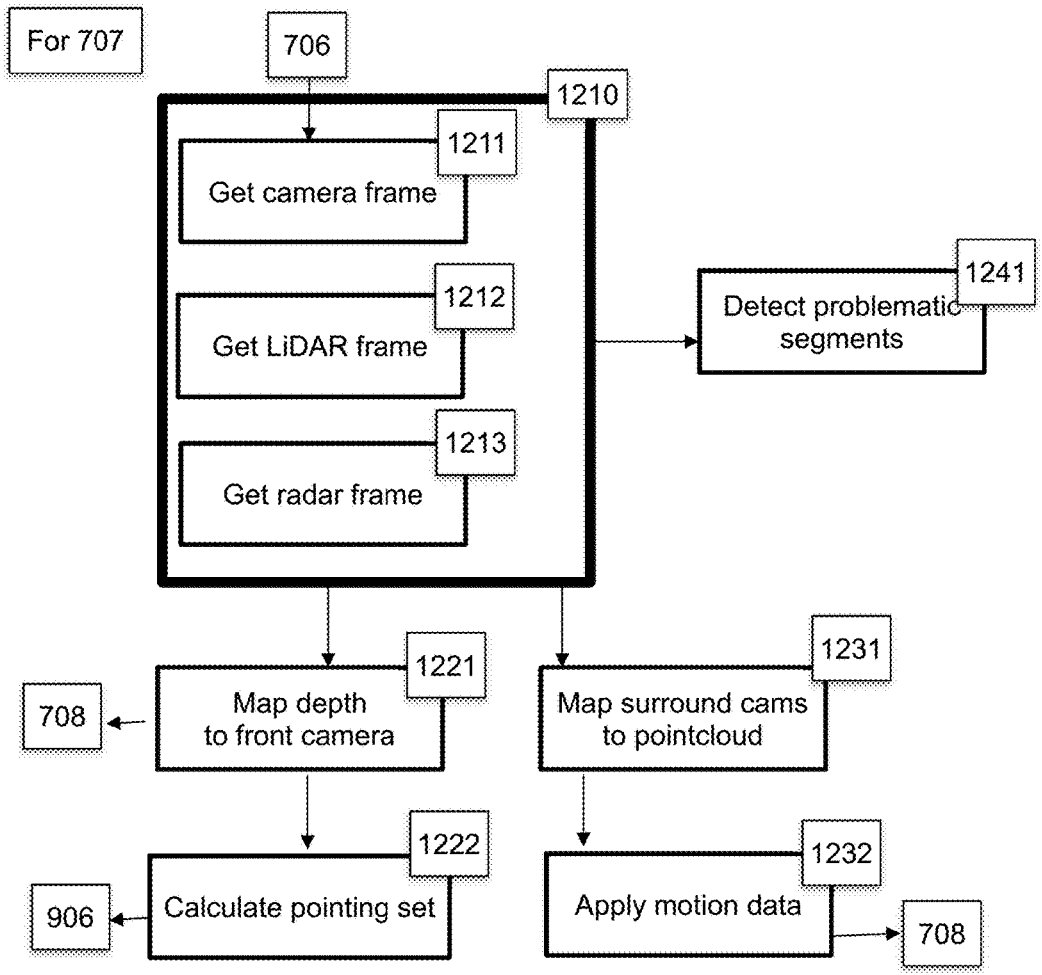
FIG. 12 is a flowchart of a method for environment mapping configured to generate 3D maps from a vehicle according to an embodiment.

FIG. 12 is a flowchart of a method for environment mapping configured to generate 3D maps from a vehicle according to one embodiment. The process in FIG. 11 may be applied to several data sources as a group, or to each data source separately. For example, the radar data and the LiDAR data may be aggregated separately using the same image data. For example, the image data may change in the process due to ROI modification or a similar mode change. At 1210, we may ensure that there is camera frame 1211, LiDAR frame 1212 and radar frame 1213 to work with. If there is no relevant frame, an empty frame may be used.

Sometimes the color and depth frames will not match. For example, there may be no reflection from a given segment. Problematic segments can be detected and corrected 1241 as required.

Following are some examples, of different mapping algorithms that may be applied to the driving direction and the surround direction respective of the vehicle. In driving direction, depth maps from camera and radar may be interpolated to have per pixel readings 1221. For the pixels with suspicious qualities, and for the image grid, pointing set may be calculated 1222 to control the sensor pointing.

For the surround mapping, several cameras may be used. Therefore, it may be advantageous to map the camera color reading and the radar velocity reading to the point-cloud of the 3D space, or the occlusion grid 1231. Within the occlusion grid, there can be confidence level per voxel based on consistency of LiDAR, radar and stereo from motion readings. When applying motion data to objects 1232, it may be advantageous to use occlusions and parametric object motion estimations.

Figure 13:
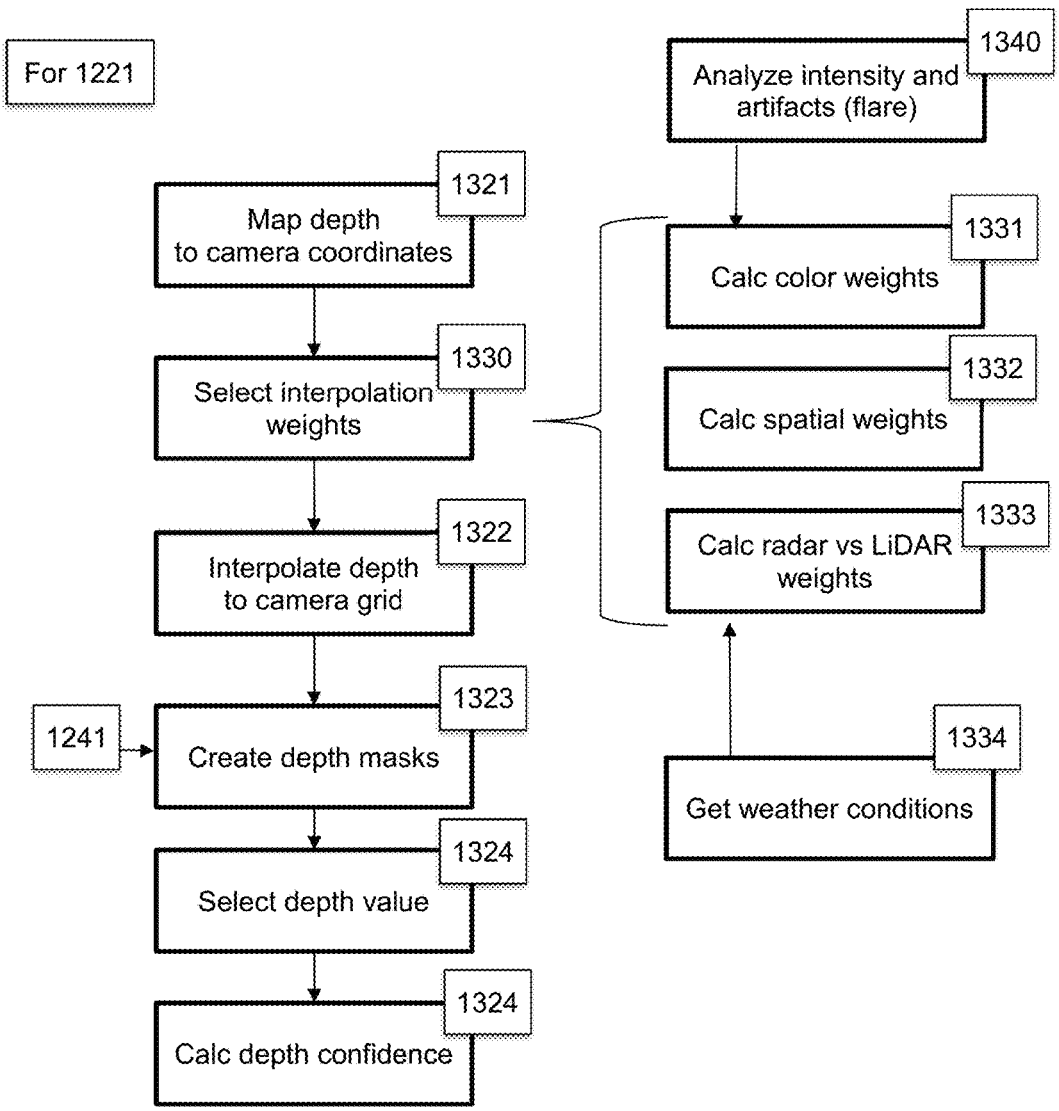
FIG. 13 is further a flowchart of a method for mapping depth to front camera configured to generate 3D maps from a vehicle according to an embodiment.

FIG. 13 is further a flowchart of a various steps for mapping depth to a front camera configured to generate 3D maps from a vehicle according to one embodiment.

The depth coordinates are projected to camera coordinates 1321. For some camera pixels, the depth coordinates will be unknown, and some will get several undesirable measurements due to occlusions.

Selected interpolation weights 1330 include several weight models, such as bilateral filters, non-local means, patch match or naïve averaging using local segmentation, spatial data, spatial speed reading, and color data.

The color weights 1331 may be calculated in RGB, HSV, grayscale, opponent colors or other color domain. The spatial weights 1332 may be calculated using 2D projection data on the camera plane and 3D point-cloud data. The calculation of radar compared to LiDAR weights 1333 may be adapted for the atmospheric conditions and local reflectivity. Weather conditions may be estimated 1334 using global statistics on noise, contrast, intensity, and other statistics. Intensity artifacts such as flare may include computation of local statistics and further projection of these statistics using some physical model such as fitting diffusion equations to intensity profile 1340.

Figure 14:
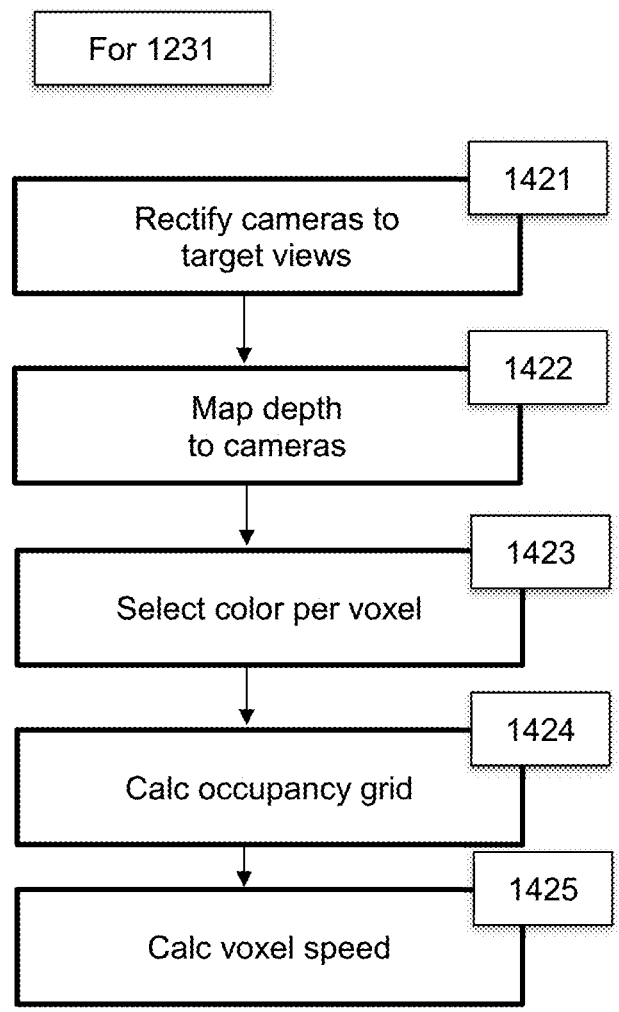
FIG. 14 is flowchart of a method for mapping surround cameras to a pointcloud configured to generate 3D maps from a vehicle according to an embodiment.

FIG. 14 is a flowchart of a method for mapping surround camera images to a point cloud configured to generate 3D maps from a vehicle according to one embodiment.

At 1421, surround cameras are rectified to target views, where each camera may be rotated differently to achieve a desired position. The cameras may be rotated to a 3D location comfortable for projection into a target point, including for example 90 degrees between planes of rectified cameras, fisheye and other distortion correction, ensuring epipolarity of cameras and imposing other criteria via relevant calibration.

The depth of an object can be mapped for each camera direction 1422, so that each camera pixel gets an XYZ value associated with it. Since the position of XYZ values on the camera plane may be subpixel, complex interpolation may be used, including joint bilateral interpolation, non-local means and patch matching. In some embodiments, the interpolation may also return the interpolation confidence.

Next, a color is selected per voxel 1423 by mapping the camera colors back into the XYZ grid. Since a given voxel may get color from several cameras, a conflict resolution may be used to produce a useful result, including selection of the color with the best confidence score.

Next, an occupancy grid is calculated 1424 by evaluating the chance that each voxel is occupied. The occupancy of each voxel may be tracked between frames using object motion estimation. For example, a voxel may be visible in some frames, occluded in other frames, and appear on edges in yet other frames.

Ultrasound sensors may be used to fill in the occupancy grid in areas invisible by the other sensors. Since the resolution of radars and ultrasound sensors may be lower than the grid resolution, the chance of occupancy in the relevant voxels may be filled by the error spread function of the relevant sensors.

The voxel speed can be calculated 1425 by using some tracking over occupancy grid, parametric motion model and radar readings. Different algorithms may be used for rigid objects like cars and non-rigid objects like pedestrians.

Figure 15:
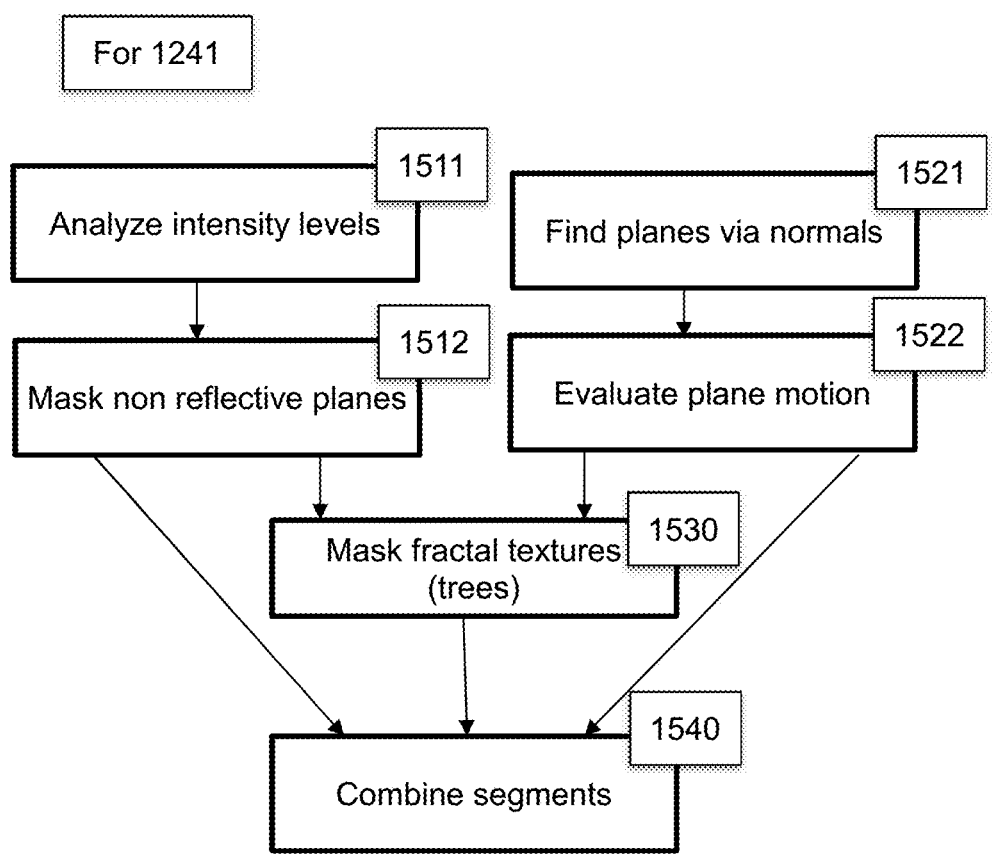
FIG. 15 is a flowchart of a method for detecting problematic segments configured to generate 3D maps from a vehicle according to an embodiment.

FIG. 15 is a flowchart of a method for detecting problematic segments configured to generate 3D maps from a vehicle according to one embodiment.

At 1511, the intensity levels are analyzed in order to detect areas with different reflection patterns. Segments with low or noisy reflection patterns may vary in RGB, infrared and LiDAR lights. There may be several threshold levels for each parameter to enable better clustering of problematic measurements. These segments may be further grouped using connected components algorithms.

At 1512, non-reflective planes are masked so that the depth measurements behind these planes get occluded. Typically, non-reflective planes will still have reflective edges or reflective readings in other wavelengths, which enable masking.

A different sort of problematic segments may be generated by broken planes. Find the planes via local normal in a gliding window 1521. Plane motion can be evaluated 1522 to remove artifacts inconsistent with motion model, such as measurement noise.

Some trees generate fractal edges both in 3D and color. These edges may be detected 1530 via local variance analysis and masked to the foreground depth.

Different segments may form 3D objects and correspond to a physical motion mode, including rotation and translation with some limited acceleration. By combining detected segments 1540, non-physical jitter may be eliminated.

Figure 16:
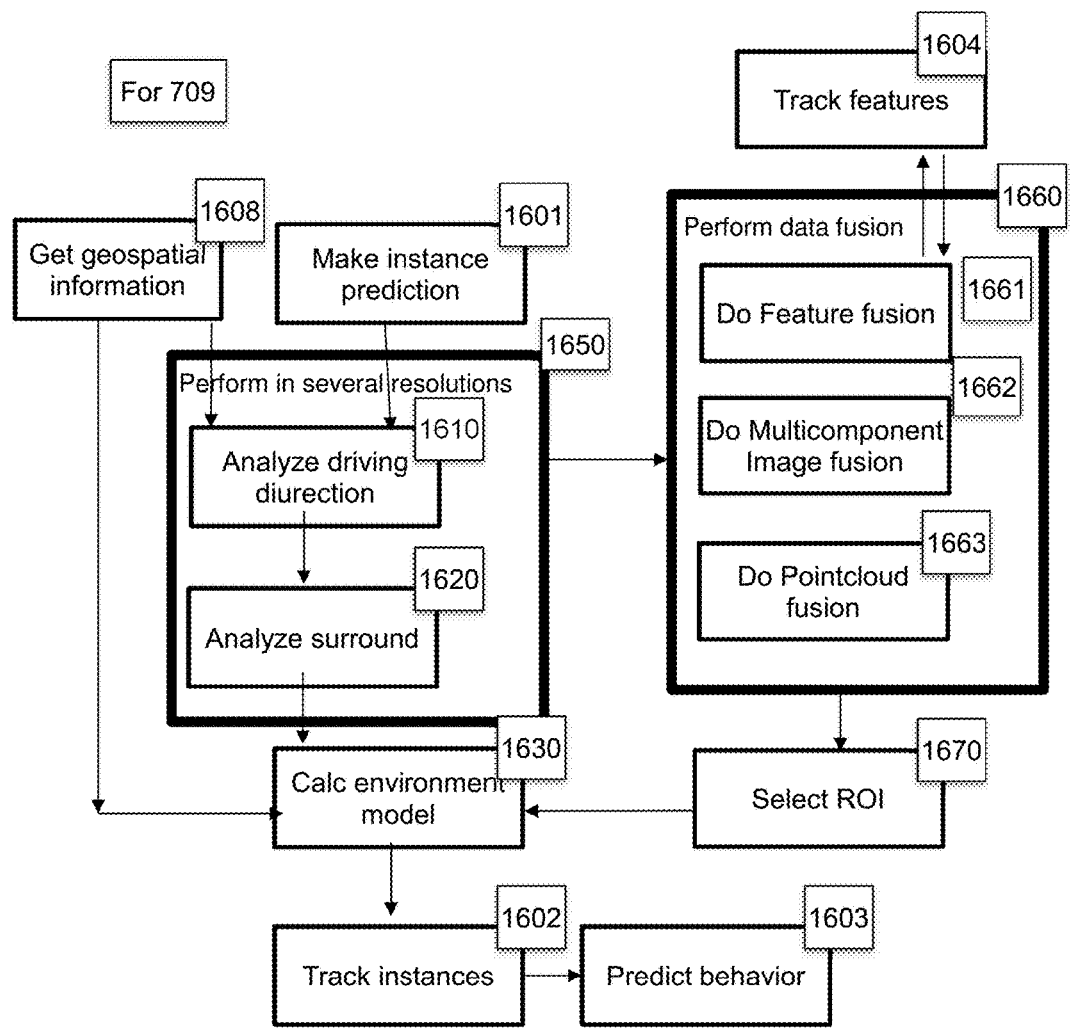
FIG. 16 is a flowchart of a method for environment analysis configured to generate environment analysis from a vehicle according to an embodiment.

FIG. 16 is a flowchart of a method for environment analysis configured to generate environment analysis from a vehicle according to one embodiment.

The environment analysis may extract instances of different kinds of objects and their properties. Objects of interest may include cars, pedestrians, cyclists, road, lane markers, free space for driving, traffic signs, traffic lights, junctions, static or moving obstacles on the road, or other types of objects.

Some instances may be tracked in time, while other instances may be new and may require detection. Some instances my cross from the surround maps to the driving map, or from the surround map to the ultrasound detection area. Some instances may be partially and temporarily obstructed by other objects, such as trees. In some embodiments, behavioral analysis of instances may be required, e.g., a pedestrian breaking away from a group, including a child running away from their parent; a car attempting to turn, and the like Some instances appear in multiple locations, including far and close locations, so the aggregate information about the instance may be more significant than the information in a given time period. Therefore, it may be useful to track each instance without losing the instance and redetecting it as another instance of a given object type.

In order to track the instance, the system may use the motion model of the instance and predict the instance locations at a given time 1601. This prediction may be compared to the actual detection and tracking results of the instances 1602 and the instance model may be modified accordingly using, for example, an LSTM neural network or extended Kalman filter. The physical model of the instance of interest may be further used to predict the instance behavior 1603 using heuristics or trained artificial intelligence mechanism.

Since each instance may be characterized by an ensemble of features, it may be beneficial also to track the specific features 1604, including handling the features currently invisible due to FOV limitations or occlusions. Feature tracking may be also performed using rigid surfaces and invariant characteristics, such as height, color histogram, color distribution by height. Since people use different colors of cloth for different body parts, and cars use different colors for wheels, body and windows, the color distribution by height may remain relatively consistent for a moving object.

Due to projective geometry of the 3D space, it may be useful to analyze the scene in several resolutions 1650. The front-driving frame analysis may be different from the surround analysis and may be performed by a separate ECU. The analysis results may be later used to calculate an environment model 1630 for a given region of interest. The region of interest may exclude areas that are not drivable and do not contain instances of the interesting objects. The ROI selection 1670 may use various features to mask the areas that are excluded from analysis. This masking may be useful to remove highly segmented and noisy data and to reduce the communication and computation toll of the system.

In some embodiments the ROI selection 1670 may be used to switch analysis mode including switching between computational expensive high-quality processing and computationally easy processing The data from the front facing frame, surround pointcloud and other data sources (for example, maps and v2v communication) may be further fused 1660 to create a viable model of the environment. The fusion may be performed in several modalities. For example, the fusion may be performed per feature of interest 1661, per imaging modality 1662, including fusion of RGB and thermal cameras or LiDAR and radar. The fusion may be performed per spatial area, including pointcloud fusion 1663.

FIG. 17 is a flowchart of a method for driving direction map analysis configured to generate environment analysis from a vehicle according to one embodiment.

The analysis may be performed using a combination of plurality of heuristics and artificial intelligence methods. These methods may include analysis of local normal, mean shift of Hierarchical Density-Based Spatial Clustering of Applications with Noise (HDBSCAN) clustering, convolutional neural networks, RNN (recurrent neural networks), neural networks with LSTM (long short time memory) layer, and probabilistic networks such as CRF (conditional random fields). Some of these methods may be configured to implement object detection, object mask detection, instance aware semantic segmentation, classification or other useful analysis.

At 1701, a bird's-eye view of the scene may be calculated by interpolation by projecting the 3D maps on the plane of the road or alternative manifold characterizing free space for driving. The interpolation may use subpixel information for distant objects and local normal to interpolate the data along the normal. The local normal may be created by analyzing the gradients in a moving window in camera plane and segmenting the planes with gradients similar to the gradient of the central pixel of the frame. Both spatial and texture gradients may be used for the analysis.

At 1702, local features are extracted per pixel, including pixels that may be detected by a trained artificial intelligence mechanism. At 1711, roads are detected based on analysis of the bird's eye view or based on the extracted features. At 1712, road lane markers are detected. In some embodiments, environmental cues, such as other cars, may be used to suggest lane markers hidden from the vehicle's cameras.

Cars, pedestrians, cyclists and other objects may be localized by object detection within some 2D or 3D boxes at 1721. This information may be further used to create masks per each instance 1722 and enable analysis of occlusions of different objects.

Further, there may be anomalies in the road, e.g., a child may throw a ball, something may fall from a truck or an animal may cross the road. These anomalies may be detected at 1715 for further analysis. The anomalies and instances of known objects may be further classified at 1730, where the classifier may use statistics of pairwise occurrence of different objects, annotated images from web search, or other useful statistics. For example, the road signs may be classified and identified 1731. These road signs may be further correlated with a map or may serve as driving instructions in unmapped situations.

Groups of instances of objects may also be analyzed at 1741 for group behavior. This may include car convoys, demonstration, parents with children, children playing, people on horses and other complex groups.

In some embodiments, the entire scene may be classified at 1742, for example as a park or as a highway, or as a parking lot or as a city road or as other suitable classification. The scene classification may be further used to refine the other detection tasks.

FIG. 18 is a flowchart of a method for vehicle surround analysis configured to generate environment analysis from a vehicle according to one embodiment. The high resolution, frequently updated driving direction map may be considered together with the surround point-cloud occupancy grid for several driving tasks as follows.

The moving objects can be segmented separately from objects currently not moving and speed and direction of the movement may be estimated at 1801. Space free for driving may be detected at 1802. The driving may occur within this free space and may include emergency maneuvers to avoid collisions, at 1811, of path planning according to map analysis at 1803 or parking space analysis at 1802. Driving recommendations are generated at 1822 and may include communication with other devices, alerts, activation of gas, break and steering wheel and other useful operations.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a high-density three-dimensional (3D) map, comprising:
    acquiring at least one high-density image of a scene using at least one passive sensor;
    acquiring at least one new set of distance measurements of the scene using at least one active sensor;
    acquiring a previously generated 3D map of the scene comprising a previous set of upsampled distance measurements;
    merging the at least one new set of distance measurements with the previous set of upsampled distance measurements, wherein merging the at least one new set of distance measurements further includes accounting for a motion transformation between a previous high-density image frame and the acquired high-density image and the acquired new set of distance measurements; and
    overlaying the merged new set of distance measurements on the acquired high-density image via an upsampling interpolation, creating an output high-density 3D map.

2. The method of claim 1, wherein the upsampling interpolation process comprises:
    defining a visual similarity metric for a tested pixel within the high-density image, wherein the visual similarity metric is employed to weigh the significance of neighboring pixels based on visual similarity to the tested pixel;
    defining an angular distance metric, wherein the angular distance metric is employed to weigh the signification of neighboring pixels based on their angular distance from the tested pixel;
    generating an optimal model of the scene based on the visual similarity metric and the angular similarity metric;
    estimating 3D coordinates based on the generated optimal model.

3. The method of claim 1, wherein the active sensor includes at least one of: a LiDAR and a radar.

4. The method of claim 3, wherein two or more active sensors are used, each active sensor having different sensor characteristics, wherein acquiring at least one set of distance measurements comprises:
    identifying a point of interest within the high-density 3D map;
    determining a performance advantage of each active sensor with regard to each identified point of interest based on the different characteristics;
    determine an optimal method of acquire the measurements by the sensors;
    employing the active sensors in the optimal method to provide a performance advantage when acquiring distance measurements for the point of interest.

5. The method of claim 4, wherein characteristics of the at least one active sensor include at least one of: field of view, beam size, angular position accuracy, target relative speed, dead time between measurements; amount of saturation captured with a direct light source, and degradation of image quality in diminished visibility conditions.

6. The method of claim 4, wherein identifying a point of interest further comprises at least one of: detecting isolated objects based on unsupervised 3D processing or supervised trained neural network; detecting stationary objects within the high density 3D map; detecting moving objects within the high density 3D map; tracking movements of objects from a first high density 3D map to second high density 3D map; identify the angular region enclosing the road behind a specific distance; identify the angular region enclosing groups of pedestrians; identify the angular region enclosing low-light area; identify the angular region enclosing saturated light areas; detecting edges in the high density 3D map; detecting patches in the high density 3D map; detecting visually distinguishable segments in the high density three dimensional map and detecting super-pixels in the high density three dimensional map.

7. The method of claim 1, wherein acquiring the previously generated 3D map further comprises: retrieving the previously generated 3D map from a storage.

8. The method of claim 1, wherein merging the at least one new set of distance measurements further comprises:

aligning the new set of distance measurements with the previous set of distance measurements to compensate for motion between the two sets.

9. The method of claim 8, wherein aligning the new set of distance measurements further comprises:
adjusting the previously generated 3D map using a motion transformation based on at least one of: the momentary 6-axis motion between captured high-density images, a speed vector, an acceleration vector, and the difference of the time stamps between the previous set of distance measurements and the new set of distance measurements.

10. A non-transitory computer readable medium having stored thereon instructions for causing a processing circuitry to perform a process for generating a high-density three-dimensional (3D) map, the process comprising:
acquiring at least one high density image of a scene using at least one passive sensor;
acquiring at least one new set of distance measurements of the scene using at least one active sensor;
acquiring a previously generated 3D map of the scene comprising a previous set of distance measurements;
merging the at least one new set of distance measurements with the previous set of upsampled distance measurements, wherein merging the at least one new set of distance measurements further includes accounting for a motion transformation between a previous high-density image frame and the acquired high density image and the acquired distance measurements; and
overlaying the merged new set of distance measurements on the high-density image via an upsampling interpolation, creating an output 3D map.

11. A system for generating a high-density three-dimensional (3D) map, comprising:
a passive sensor configured to acquire at least one high density image of a scene using a passive sensor;
at least one active sensor configured to acquire at least one set of distance measurements of the scene using at least one active sensor;
a processing circuitry; and
a memory, the memory containing instructions that, when executed by the processing circuitry, configure the system to:
acquire at least one high density image of a scene using at least one passive sensor;
acquire at least one new set of distance measurements of the scene using at least one active sensor;
acquire a previously generated 3D map of the scene comprising a previous set of distance measurements;
merge the at least one new set of distance measurements with the previous set of upsampled distance measurements, wherein merging the at least one new set of distance measurements further includes accounting for a motion transformation between a previous high-density image frame and the acquired high density image and the acquired distance measurements; and
overlay the merged new set of distance measurements on the high-density image via an upsampling interpolation, creating an output high-density 3D map.

12. The system of claim 11, wherein the system is further configured:
define a visual similarity metric for a tested pixel within the high-density image, wherein the visual similarity metric is employed to weigh the significance of neighboring pixels based on visual similarity to the tested pixel;
define an angular distance metric, wherein the angular distance metric is employed to weigh the signification of neighboring pixels based on their angular distance from the tested pixel;
generate an optimal model of the scene based on the visual similarity metric and the angular similarity metric;
estimate 3D coordinates based on the generated optimal model.

13. The system of claim 11, wherein the active sensor includes at least one of: a LiDAR and a radar.

14. The system of claim 13, wherein two or more active sensors are used, each active sensor having different sensor characteristics.

15. The system of claim 14, wherein the system is further configured to:
identify a point of interest within the high-density image;
determine a performance advantage of each active sensor with regard to each identified point of interest based on the different characteristics;
employ the active sensor determined to provide a performance advantage when acquiring distance measurements for the point of interest.

16. The system of claim 15, wherein characteristics of the at least one active sensor include: field of view, beam size, angular position accuracy, target relative speed, dead time between measurements; amount of saturation captured with a direct light source, and degradation of image quality in diminished visibility conditions.

17. The system of claim 15, wherein identifying a point of interest further comprises at least one of: detecting isolated objects based on unsupervised 3D processing or supervised trained neural network; detecting stationary objects within the high density 3D map; detecting moving objects within the high density 3D map; tracking movements of objects from a first high density 3D map to second high density 3D map; identify the angular region enclosing the road behind a specific distance; identify the angular region enclosing groups of pedestrians; identify the angular region enclosing low-light area; identify the angular region enclosing saturated light areas; detecting edges in the high density 3D map; detecting patches in the high density 3D map; detecting visually distinguishable segments in the high density 3D map and detecting super-pixels in the high density 3D map.

18. The system of claim 11, wherein the system is further configured to:
retrieve the previously generated 3D map from a storage.

19. The system of claim 18, wherein the system is further configured to:
align the new set of distance measurements with the previous set of distance measurements to compensate for motion between the two sets.

20. The system of claim 19, wherein the system is further configured to:
adjust the previously generated 3D map using a motion transformation based on at least one of: the momentary 6-axis motion between captured high-density images, a speed vector, an acceleration vector, and the difference of the time stamps between the previous set of distance measurements and the new set of distance measurements.

* * * * *